United States Patent
Yukimasa et al.

(10) Patent No.: US 8,318,365 B2
(45) Date of Patent: Nov. 27, 2012

(54) FUEL CELL SYSTEM WITH BYPASS PATH AND OPERATION METHOD FOR CONTROLLING BYPASS PATH OF FUEL CELL SYSTEM

(75) Inventors: Akinori Yukimasa, Osaka (JP); Masataka Ozeki, Osaka (JP); Hideo Ohara, Osaka (JP); Akinari Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 12/530,932

(22) PCT Filed: Mar. 14, 2008

(86) PCT No.: PCT/JP2008/000597
§ 371 (c)(1),
(2), (4) Date: Sep. 11, 2009

(87) PCT Pub. No.: WO2008/126353
PCT Pub. Date: Oct. 23, 2008

(65) Prior Publication Data
US 2010/0136450 A1    Jun. 3, 2010

(30) Foreign Application Priority Data

Mar. 14, 2007   (JP) ................... 2007-065887

(51) Int. Cl.
*H01M 8/04*    (2006.01)
*H01M 8/06*    (2006.01)

(52) U.S. Cl. ........ 429/415; 429/408; 429/416; 429/423; 429/428; 429/429; 429/432; 429/443; 429/444

(58) Field of Classification Search .............. 429/432, 429/408, 415, 416, 423, 428, 429, 443, 444
See application file for complete search history.

(56) References Cited

U.S. PATENT DOCUMENTS

2005/0129990 A1* 6/2005 Ozeki et al. .................. 429/12
(Continued)

FOREIGN PATENT DOCUMENTS

JP       07-267604       10/1995
(Continued)

OTHER PUBLICATIONS

Takada, K., Machine translation of JP 2006-318714 A, Nov. 2006.*

*Primary Examiner* — Basia Ridley
*Assistant Examiner* — Sean P Cullen
(74) *Attorney, Agent, or Firm* — McDermott Will & Emery LLP

(57) ABSTRACT

A fuel cell system of the present invention comprises a fuel cell (1) configured to generate electric power using a fuel gas, a fuel gas generator (2) configured to generate a fuel gas containing hydrogen using a raw material, a combustion burner (2a) configured to heat the fuel gas generator, a combustion fan (2b) configured to supply air to a combustion burner (2a), and a controller (101). The raw material is filled inside the fuel cell (1) before the fuel gas is supplied to the fuel cell. The controller (101) controls on-off valves (8, 9) to cause the fuel gas to branch to flow to a second path (R2) and to a fourth path (R4) when the fuel gas generated in the fuel gas generator (2) starts to be supplied to the fuel cell (1).

11 Claims, 10 Drawing Sheets

U.S. PATENT DOCUMENTS

| | | | |
|---|---|---|---|
| 2008/0038599 A1* | 2/2008 | Ozeki et al. | 429/19 |
| 2009/0047555 A1* | 2/2009 | Sugawara et al. | 429/19 |
| 2009/0117426 A1* | 5/2009 | Harada et al. | 429/20 |

FOREIGN PATENT DOCUMENTS

| | | |
|---|---|---|
| JP | 2001-114502 | 4/2001 |
| JP | 2001-165431 | 6/2001 |
| JP | 2001-176528 | 6/2001 |
| JP | 2003-160307 | 6/2003 |
| JP | 2003-229149 | 8/2003 |
| JP | 2003-229156 | 8/2003 |
| JP | 2003-272681 | 9/2003 |
| JP | 2006-228654 | 8/2006 |
| JP | 2006-318714 | 11/2006 |
| WO | WO 2006049299 A1 * | 5/2006 |
| WO | WO 2006/087994 A1 | 8/2006 |
| WO | WO 2007/123136 A1 | 11/2007 |

* cited by examiner

FUEL CELL SYSTEM WITH BYPASS PATH AND OPERATION METHOD FOR CONTROLLING BYPASS PATH OF FUEL CELL SYSTEM

RELATED APPLICATIONS

This application is the U.S. National Phase under 35 U.S.C. §371 of International Application No. PCT/JP2008/000597, filed on Mar. 14, 2008, which in turn claims the benefit of Japanese Application No. 2007-065887, filed on Mar. 14, 2007, the disclosures of which Applications are incorporated by reference herein.

TECHNICAL FIELD

The present invention relates to a fuel cell system configured to generate electric power using hydrogen and oxygen, and an operation method of the fuel cell system.

BACKGROUND ART

Conventionally, a fuel cell system capable of high-efficiency and small-scale power generation easily constructs a system for making use of heat energy generated in power generation, and therefore has been developed as a distributed power generation system capable of achieving high energy use efficiency.

During a stop operation of the fuel cell system, when the interior of the system is cooled to have a negative pressure, and thereby air flows into the system, residual hydrogen inside the fuel cell may be rapidly oxidized by oxygen in air, and the fuel cell system may be damaged due to a reaction heat resulting from the oxidation reaction.

To solve such a problem, a fuel cell system has been proposed, in which a residual gas inside the fuel cell is purged using a raw material such as a natural gas and the raw material is filled in a sealed state inside the fuel cell, at the time of stop operation (e.g., patent document 1).

FIG. 10 is a view of a configuration of the proposed fuel cell system. As shown in FIG. 10, the conventional fuel cell system includes a fuel gas generator 500 configured to generate a hydrogen-rich fuel gas from a raw material which is mainly composed of carbon and hydrogen, a fuel gas supply path 502 through which the fuel gas is supplied from the fuel gas generator 500 to a fuel cell 501 and an off-gas supply path 503 through which a fuel gas (hereinafter referred to as off-gas) which has not been used in power generation and is exhausted from the fuel cell 501 is supplied to a combustion burner 500a of the fuel gas generator 500. The fuel cell system further includes a fuel cell bypass path 504 provided between the fuel gas supply path 502 and the off-gas supply path 503 to switch a fuel gas destination from the fuel cell 501 to the combustion burner 500a of the fuel gas generator 500, a material supplier 505 configured to supply a raw material used to generate the fuel gas to the fuel gas generator 500, and a fuel gas generator bypass path 506 for directly feeding the raw material from the material supplier 505 to the fuel cell 501 so as to bypass the fuel gas generator 500. A three-way valve 507 is provided at a branch portion where the fuel gas supply path 502 branches into the fuel cell bypass path 504. In addition, an on-off valve 508 is provided at a portion of the off-gas supply path 503 in a location upstream of a junction portion where fuel cell bypass path 504 is joined to the off-gas supply path 503. A blower 509 is provided to supply air as an oxidizing gas to the fuel cell 501.

In the above proposed fuel cell system, at the time of the start-up operation, the fuel gas which is generated in the fuel gas generator 500 and contains carbon monoxide having a higher concentration than carbon monoxide at the time of the power generation, is supplied to the combustion burner 500a of the fuel gas generator 500 through the fuel cell bypass path 504. The combustion gas is combusted in the combustion burner 500a to heat a reforming catalyst and increase its temperature.

After the start of the power generation operation, when the temperature of the reforming catalyst in the fuel gas generator 500 reaches a predetermined temperature, the fuel gas generated in the fuel gas generator 500 is supplied to the fuel cell 501 through the fuel gas supply path 502. The fuel gas is used as a fuel for power generation in the fuel cell 501. The off-gas which is exhausted from the fuel cell 501 is supplied to the combustion burner 500a of the fuel gas generator 500 via the off-gas supply path 503. In the combustion burner 500a, the off-gas is combusted to heat the reforming catalyst.

In the proposed fuel cell system, after stop of the power generation operation of the fuel cell system, the raw material is fed as a replacement gas from the material supplier 505 and filled into the fuel cell 501 via the fuel gas generator bypass path 506. Thereby, during a stop state of the power generation operation of the fuel cell system, the raw material such as the natural gas, which replaces an inert gas such as a nitrogen gas, is filled in a sealed state inside the fuel cell 501 and its surrounding region.

The raw material such as the natural gas which is fed from the material supplier 505 and filled into the fuel cell 501 at the time of the stop operation is chemically stable as compared to the hydrogen contained in the fuel gas. Therefore, even if air is mixed with the raw material such as the natural gas remaining inside the fuel cell 501 during the stop state of the power generation operation, a rapid oxidation will not proceed.

As should be appreciated from the above, in the conventional fuel cell system, damage to the fuel cell system due to the reaction heat generated by the oxidation reaction is effectively prevented by filling the raw material such as the natural gas into the fuel cell 501.

Patent document 1: Japanese Laid-Open Patent Application Publication 2003-229149

DISCLOSURE OF THE INVENTION

Problems to be Solved by the Invention

However, in the above described conventional fuel cell system, when the temperature of the reforming catalyst in the fuel gas generator 500 reaches a predetermined temperature and the fuel gas generator 500 starts to supply the fuel gas to the fuel cell 501 at the time of the start-up operation, the raw material such as the natural gas filled into the fuel cell 501 at the time of the stop operation is pushed out from the fuel cell 501 by the fuel gas supplied from the fuel gas generator 500.

The pushed-out raw material is supplied to the combustion burner 500a of the fuel gas generator 500 for a predetermined time period. This arises a problem that during the predetermined time period, incomplete combustion occurs due to deficiency of oxygen in the combustion burner 500a, exhausting carbon monoxide to atmosphere.

This will be described specifically. At the time of the start-up operation, as described above, initially, the three-way valve 507 is switched to open the fuel cell bypass path 504, and the combustion burner 500a conducts combustion using hydrogen contained in the fuel gas. To this end, the fuel cell system is configured to supply air to the combustion burner 500a with an amount corresponding to the amount of hydrogen.

However, if the raw material pushed out from the fuel cell 501 is supplied to the combustion burner 500a, methane in the raw material (natural gas) needs a larger amount of oxygen to achieve the complete combustion than hydrogen in the fuel gas. Therefore, if the amount of air supplied to the combustion burner 500a continues to be unchanged, deficiency of oxygen may occur in the combustion reaction in the combustion burner 500a.

As described above, the conventional fuel cell system has a problem that at the start of the power generation operation, deficiency of oxygen occurs in the combustion reaction in the combustion burner 500a and carbon monoxide is exhausted to atmosphere, during a predetermined period from when the fuel gas generator 500 starts to supply the fuel gas to the fuel cell 501.

The present invention has been developed to solve the above described problem, and an object of the present invention is to provide a fuel cell power generation system which is capable of suppressing incomplete combustion in a combustor of a fuel gas generator to suppress exhausting of carbon monoxide when the fuel gas generator starts to supply the fuel gas to the fuel cell filled with a raw material therein, and an operation method of the fuel cell power generation system.

Means for Solving the Problem

To achieve the above mentioned object, a fuel cell system of a first invention of the present invention comprises a fuel cell configured to generate electric power using a fuel gas and an oxidizing gas; a fuel gas generator configured to generate the fuel gas containing hydrogen from a raw material; a fuel gas supply path through which the fuel gas is supplied from the fuel gas generator to the fuel cell; a combustor configured to heat the fuel gas generator; an off-gas path through which the fuel gas which has not been used in power generation is supplied from the fuel cell to the combustor; a bypass path connecting the fuel gas supply path to the off-gas path to supply the fuel gas output from the fuel gas generator to the combustor so as to bypass the fuel cell; a flow rate controller configured to control a flow rate of the fuel gas which is output from the fuel gas generator and supplied to the fuel cell and a flow rate of the fuel gas which is output from the fuel gas generator and supplied to the bypass path; and a controller; wherein the raw material is filled inside the fuel cell before the fuel gas generator starts to supply the fuel gas to the fuel cell; and wherein the controller is configured to control the flow rate controller such that the fuel gas branches to flow to the fuel cell and to the bypass path, when the fuel gas generator starts to supply the fuel gas to the fuel cell.

A second invention of the present invention is the fuel cell system according to the first invention, wherein the controller is configured to control the flow rate controller such that the fuel gas does not flow toward the bypass path but the fuel gas output from the fuel gas generator is supplied only to the fuel cell, after an elapse of a predetermined time from when the fuel gas generator starts to supply the fuel gas to the fuel cell.

A third invention of the present invention is the fuel cell system according to the second invention, wherein the predetermined time is not shorter than a time required to purge, from the fuel cell, the raw material filled inside the fuel cell.

A fourth invention of the present invention is the fuel cell system according to the second invention, further comprising a voltage detector configured to detect a voltage of the fuel cell; wherein the predetermined time is a time period from when the fuel gas generator starts to supply the fuel gas to the fuel cell until the voltage detected by the voltage detector reaches a predetermined threshold or larger.

A fifth invention of the present invention is the fuel cell system according to the first invention, wherein the controller is configured to control the flow rate controller such that the fuel gas flows through the bypass path and is combusted in the combustor, before the fuel gas generator starts to supply the fuel gas to the fuel cell.

A sixth invention of the present invention is the fuel cell system according to any one of the first to fifth inventions, wherein the flow rate controller includes: a first flow rate controller disposed on a portion of the fuel gas supply path which is located between a branch portion where the fuel gas supply path branches into the bypass path, and the fuel cell; and a second flow rate controller disposed on a portion of the off-gas path which is located between a junction portion where the bypass path is joined to the off-gas path, and the fuel cell; wherein the controller is configured to control the first flow rate controller and the second flow rate controller such that the fuel gas branches to flow to the fuel cell and to the bypass path, when the fuel gas generator starts to supply the fuel gas to the fuel cell.

A seventh invention of the present invention is the fuel cell system according to any one of the first to fifth inventions, wherein the flow rate controller includes a flow divider disposed at a branch portion where the fuel gas path branches into the bypass path to adjust a flow rate ratio with which the fuel gas output from the fuel gas generator branches to flow to the fuel cell and to the bypass path; wherein the controller is configured to control the flow divider such that the fuel gas branches to flow to the fuel cell and to the bypass path when the fuel gas generator starts to supply the fuel gas to the fuel cell.

An eighth invention of the present invention is the fuel cell system according to any one of the first to fifth inventions, wherein the flow rate controller includes a mixer disposed at a junction portion where the bypass path is joined to the off-gas path to adjust a mixing ratio between the fuel gas flowing in the bypass path and an excess fuel gas which has not been used in power generation and flows through the off-gas path; and wherein the controller is configured to control the mixer such that the fuel gas branches to flow to the fuel cell and to the bypass path, when the fuel gas generator starts to supply the fuel gas to the fuel cell.

A ninth invention of the present invention is the fuel cell system according to the sixth invention, wherein the first flow rate controller and the second flow rate controller are on-off valves, and a passage resistance of the fuel gas supply path, a passage resistance of the off-gas path, a passage resistance of the bypass path, and a passage resistance of the fuel cell are preset so that the air ratio in the combustor is 1 or larger, in a state where each of the on-off valves is opened by the controller to cause the fuel gas to branch to flow to the fuel cell and to the bypass path, when the fuel gas generator starts to supply the fuel gas to the fuel cell.

A tenth invention of the present invention is the fuel cell system according to the seventh invention, wherein the controller is configured to control the flow divider to adjust the flow rate ratio so that the air ratio in the combustor is 1 or larger.

An eleventh invention of the present invention is the fuel cell system according to the eighth invention, wherein the controller is configured to control the mixer to adjust the mixing ratio so that the air ratio in the combustor is 1 or larger.

A twelfth invention of the present invention is the fuel cell system according to any one of the first to eleventh inventions, wherein the raw material is a hydrocarbon gas.

A thirteenth invention of the present invention is the fuel cell system according to any one of the first to twelfth inventions, further comprising: a material supplier configured to supply the raw material; wherein the controller causes the material supplier to supply the raw material to the fuel cell to fill the raw material inside the fuel cell, during a stop operation, a start-up operation, or a stop state.

A fourteenth invention of the present invention is the fuel cell system further comprising: a material supplier configured to supply the raw material to the fuel gas generator; wherein the controller is configured to cause the material supplier to fill the raw material inside the fuel cell during a state where power generation of the fuel cell is stopped; and then to execute control to cause the fuel gas to branch.

A fifteenth invention of the present invention is a method of operating a fuel cell system including: a fuel cell configured to generate electric power using a fuel gas and an oxidizing gas; a fuel gas generator configured to generate the fuel gas containing hydrogen from a raw material, through a reforming reaction; a fuel gas supply path through which the fuel gas is supplied from the fuel gas generator to the fuel cell; a combustor configured to heat the fuel gas generator; an off-gas path through which the fuel gas which has not been used in power generation is supplied from the fuel cell to the combustor; and a bypass path connecting a portion of the fuel gas supply path to a portion of the off-gas path; wherein the raw material is filled inside the fuel cell before the fuel gas generator starts to supply the fuel gas to the fuel cell; the method comprising: a flow dividing step for causing the fuel gas to branch to flow to the fuel cell and to the bypass path, when the fuel gas generator starts to supply the fuel gas to the fuel cell through the fuel gas supply path.

The above and further objects, features and advantages of the present invention will more fully be apparent from the following detailed description of preferred embodiments with accompanying drawings.

Effects of the Invention

In accordance with the present invention, it is possible to provide a fuel cell system which is capable of suppressing incomplete combustion in a combustor of a fuel gas generator to suppress exhausting of carbon monoxide when a fuel gas generator starts to supply a fuel gas to a fuel cell filled with a raw material therein, and an operation method of the fuel cell system.

EXPLANATION OF REFERENCE NUMERALS

Figure 1:
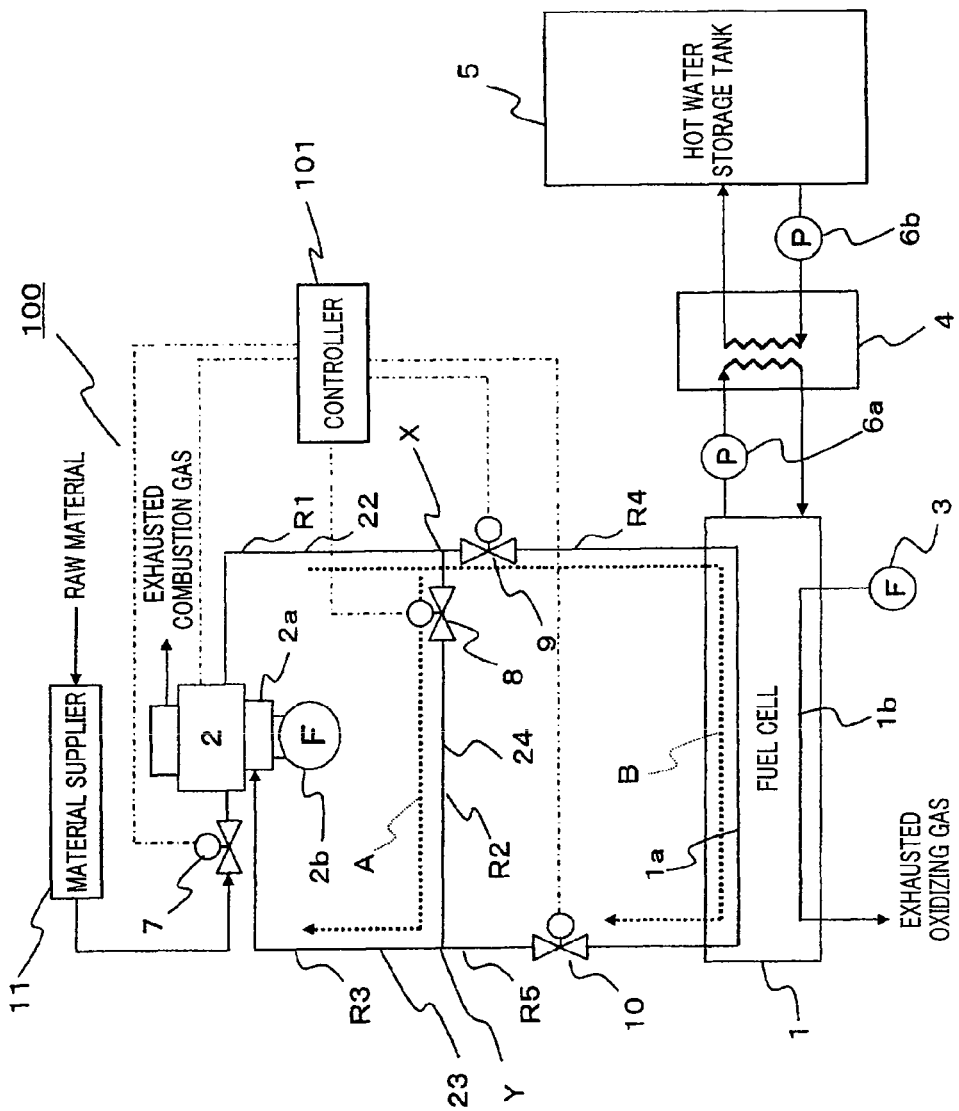
FIG. 1 is a block diagram schematically showing a configuration of a fuel cell system according to Embodiment 1 of the present invention.

1 fuel cell
1a fuel gas passage
1b oxidizing gas passage
2 fuel gas generator
2a combustion burner
2b combustion fan
3 blower
4 heat exchanger
5 hot water storage tank
6a, 6b pump
7, 8, 9, 10 on-off valve
11 material supplier
12 flow divider
13 mixer
14, 15 flow rate control valve
22 fuel gas supplier
23 off-gas path
24 bypass path
25 combustible gas detector
26 voltage detector
27 electric power output terminal
28 exhausted combustion gas path
100, 200, 300, 400 fuel cell system
101 controller
R1 first path
R2 second path
R3 third path
R4 fourth path
R5 fifth path
A first fuel gas path
B second fuel gas path

BEST MODE FOR CARRYING OUT THE INVENTION

Hereinafter, best mode for carrying out the invention will be described with reference to the drawings.

Embodiment 1

FIG. 1 is a block diagram schematically showing a configuration of a fuel cell system according to Embodiment 1 of the present invention. In FIG. 1, solid lines connecting components in the fuel cell system indicate the paths through which water, a fuel gas, an oxidizing gas, electric signals, etc, flow. In addition, arrows depicted on these solid lines indicate flow directions in which the water, the fuel gas, the oxidizing gas, etc flow. In FIG. 1, only the components required to describe the present invention are illustrated and the other components are omitted.

First of all, the configuration of a fuel cell system 100 according to Embodiment 1 will be described.

As shown in FIG. 1, the fuel cell system 100 of embodiment 1 includes a fuel cell 1 which is a power generation section, a fuel gas generator 2 configured to supply a fuel gas containing hydrogen to a fuel gas passage 1a of the fuel cell 1, and a blower 3 configured to supply air as the oxidizing gas to an oxidizing gas passage 1b of the fuel cell 1. To generate the fuel gas through a reforming reaction, a material supplier 11 is provided to supply a raw material such as a natural gas to the fuel gas generator 2. Furthermore, the fuel gas generator 2 is provided with a combustion burner 2a for heating the reforming catalyst. A combustion fan 2b is provided to supply air required for combustion from atmosphere to the combustion burner 2a.

A hot water storage tank 5 is provided to supply hot water, etc. A heat exchanger 4 is provided to exchange heat between water inside the hot water storage tank 5 and cooling water for cooling the fuel cell 1 to heat the water inside the hot water storage tank 5.

Subsequently, the paths connecting the fuel cell 1 to the fuel gas generator 2 will be described.

In the fuel cell system 100, a fuel gas supply path 22 is provided to supply the fuel gas generated in the fuel gas generator 2 to a fuel gas passage 1a of the fuel cell 1 and an off-gas path 23 is provided to supply an off-gas exhausted from the fuel gas passage 1a of the fuel cell 1 to the combustion burner 2a. In addition, a bypass path 24 is provided so as to branch from the fuel gas supply path 22, bypass the fuel cell 1 and is joined to the off-gas path 23.

Using the branch portion where the fuel gas supply path 22 branches into the bypass path 24 in FIG. 1, as a reference, a portion of the fuel gas supply path 22 which is closer to the fuel gas generator 2 is called a first path R1 and a portion of the fuel gas supply path 22 which is closer to the fuel cell 1 is called a fourth path R4. In addition, using the junction portion where the bypass path 24 is joined to the off-gas path 23, as a reference, a portion of the off-gas path 23 which is closer to the combustion burner 2a is called a third path R3 and a portion of the off-gas path 23 which is closer to the fuel cell 1 is called a fifth path R5. Furthermore, the bypass path 24 is called a second path R2. An on-off valve 9 is provided on the fourth path R4, an on-off valve 8 is provided on the second path R2, and an on-off valve 10 is provided on the fifth path R5.

The first path R1 branches into the second branch R2 and the fourth path R4. This branch portion is depicted as X. The second path R2 is joined to the fifth path R5 to form the third path. This junction portion is depicted as Y.

As shown in FIG. 1, the first path R1, the second path R2, and the third path R3 form a first fuel gas path A. Also, as shown in FIG. 1, the first path R1, the four path R4, the fuel gas passage 1a, the fifth path R and the third path R3 form a second fuel gas path B.

That is, the fuel cell system 100 according to Embodiment 1 is configured to open and close an on-off valve 7, the on-off valve 8, the on-off valve 9 and the on-off valve 10 to be able to directly supply the fuel gas exhausted from the fuel gas generator 2 to the combustion burner 2a as necessary without supplying it to the fuel cell 1.

The fuel cell system 100 includes a controller 101 configured to properly control the operations of the components (on-off valves 7, 8, 9, and 10, the fuel gas generator 2, etc) in the fuel cell system 100.

The components of the fuel cell system 100 of this Embodiment will be described in detail.

As the above described fuel cell 1, a polymer electrolyte fuel cell is used in Embodiment 1. The fuel cell 1 carries out power generation to output a predetermined electric power using a hydrogen-rich fuel gas supplied to the fuel gas passage 1a of the fuel cell 1 and the oxidizing gas (normally, air) supplied to the oxidizing gas passage 1b by the blower 3.

In other words, the fuel cell 1 directly converts a chemical energy of the fuel gas and the oxidizing gas into an electric energy through a predetermined electrochemical chemical reaction which proceeds using a predetermined reaction catalyst. The fuel cell 1 supplies the electric energy obtained by such energy conversion to a load connected to the fuel cell system 100. The detailed description of the internal structure of the fuel cell 1 will be omitted, because the internal structure of the fuel cell 1 is similar to the internal structure of a general polymer electrolyte fuel cell.

During the power generation operation, the fuel cell 1 generates heat through a predetermined electrochemical reaction for the above energy conversion. The heat generated in the fuel cell 1 is continuously recovered by the cooling water supplied to a cooling water passage (not shown) formed inside the fuel cell 1, is used in the heat exchanger 4 for heat exchange with the water supplied from the hot water storage tank 5, and is stored as hot water in the hot water storage tank 5. A pump 6a is provided between the fuel cell 1 and the heat exchanger 4. The cooling water which is cooled by heat exchange in the heat exchanger 4 is supplied again to the cooling water passage of the fuel cell 1 by the operation of the pump 6a. A pump 6b is provided between the hot water storage tank 5 and the heat exchanger 4. The water supplied from the hot water storage tank 5 by the pump 6b is caused to exchange heat in the heat exchanger 4 and heated, and is stored as hot water in the hot water storage tank 5.

The fuel gas generator 2 primarily proceeds a steam reforming reaction using a raw material containing an organic compound which is composed of at least carbon and hydrogen which is represented by a hydrocarbon based component such as a natural gas (containing methane as a major component) or a propane gas, alcohol such as methanol, or naphtha component (raw material) and water, to generate the hydrogen-rich fuel gas through the steam reforming reaction. The material supplier 11 supplies the raw material to the fuel gas generator 2. The on-off valve 7 is provided to enable and disenable the raw material to be supplied to the fuel gas generator 2.

The fuel gas generator 2 includes a reformer for proceeding the steam reforming reaction, and a shift converter and a purifier for reducing carbon monoxide in the fuel gas exhausted from the reformer (not shown). The reformer has the reforming catalyst for proceeding the steam reforming reaction. The reforming catalyst is heated by combustion of the off-gas exhausted from the fuel cell 1, the fuel gas, or the like, which is conducted in the combustion burner 2a, allowing the steam reforming reaction to be promoted.

The combustion burner 2a combusts the off-gas exhausted from the fuel cell 1 or the fuel gas generated in the fuel gas generator 2, as a combustion fuel, to generate the heat energy for heating the reforming catalyst in the reformer.

The shift converter has a shift catalyst for reducing a concentration of carbon monoxide in the fuel gas exhausted from the reformer through a reaction with water. The purifier has a CO removal catalyst for further reducing a carbon monoxide in the fuel gas exhausted from the shift converter through an oxidation reaction or a methanation reaction. To effectively reduce the carbon monoxide contained in the fuel gas, the shift converter and the purifier are respectively operated under temperature conditions suitable for the chemical reactions proceeding in the shift converter and in the purifier. The components within the fuel gas generator 2, which are other than the fuel gas generator, the shift converter, and the purifier will not be described herein, because the internal structure of the fuel cell gas generator 2 is similar to the internal structure of a general fuel gas generator.

The material supplier 11 supplies the raw material such as the natural gas supplied from an infrastructure or the like of the natural gas to the reformer of the fuel gas generator 2 via the on-off valve 7, during the power generation operation of the fuel cell system 100, or the like. The material supplier 11 has a flow rate control unit (not shown). As described above, the controller 101 is configured to cause the flow rate control unit to properly adjust the amount of raw material supplied to the reformer of the fuel gas generator 2 as required.

The blower 3 suctions air from atmosphere to supply air as the oxidizing gas to the oxidizing gas passage 1*b* of the fuel cell 1. As the blower 3, a sirocco fan or the like is suitably used.

The controller 101 includes, for example, a memory unit, a timer unit, a central processing unit (CPU), etc. The program relating to the operation of each component in the fuel cell system 100 is pre-stored in the memory unit of the controller 101. Based on the program stored in the memory unit, the controller 101 properly controls the operation of the fuel cell system 100.

An example of a first flow rate controller of the present invention is the on-off valve 9 of this Embodiment. An example of a second flow rate controller of the present invention is the on-off valve 10 of this Embodiment. An example of a third flow rate controller of the present invention is the on-off valve 8 of this Embodiment. An example of the material supplier of the present invention is the material supplier 11 of this Embodiment. An example of the combustor of the present invention is the combustion burner 2*a*.

Subsequently, the operation of the fuel cell system 100 according to Embodiment 1 of the present invention will be described in detail with reference to the drawings.

Hereinafter, it is supposed that at the time of stop operation, in a stand-by state, or at the time of start-up operation of the fuel cell system 100, the raw material (in Embodiment 1, the natural gas which is a hydrocarbon gas) is pre-filled as the replacement gas in the fuel gas passage 1*a* of the fuel cell 1 and its surrounding region. In Embodiment 1, as the raw material, the natural gas which is a hydrocarbon gas, is used, but a raw material containing an organic compound composed of at least carbon and hydrogen may be used. The raw material is filled in the fuel cell 1, or the like in such a manner that after stopping the generation of the fuel gas in the fuel gas generator 2 at the time of stop operation, the raw material is supplied from the material supplier 11 to the fuel cell 1 via the fuel gas generator 2. After filling the raw material in the fuel cell 1 or the like, the on-off valves 9 and 10 are closed. The on-off valve 8 may be opened or closed. In this Embodiment, the on-off valve 8 is closed.

In this embodiment 1, as used herein, the term "at the time of start-up operation" refers to "during a period from when the controller 101 outputs a start-up command until a power generation controller (not shown) of the fuel cell 1 takes out an electric current from the fuel cell 1." The term "at the time of stop operation" refers to "during a period from when the controller 101 outputs a stop command until the operation of the entire fuel cell system 100 is completely stopped." The term "stand-by state" refers to a period between at the time of stop operation and at the time of start-up operation.

Figure 2:
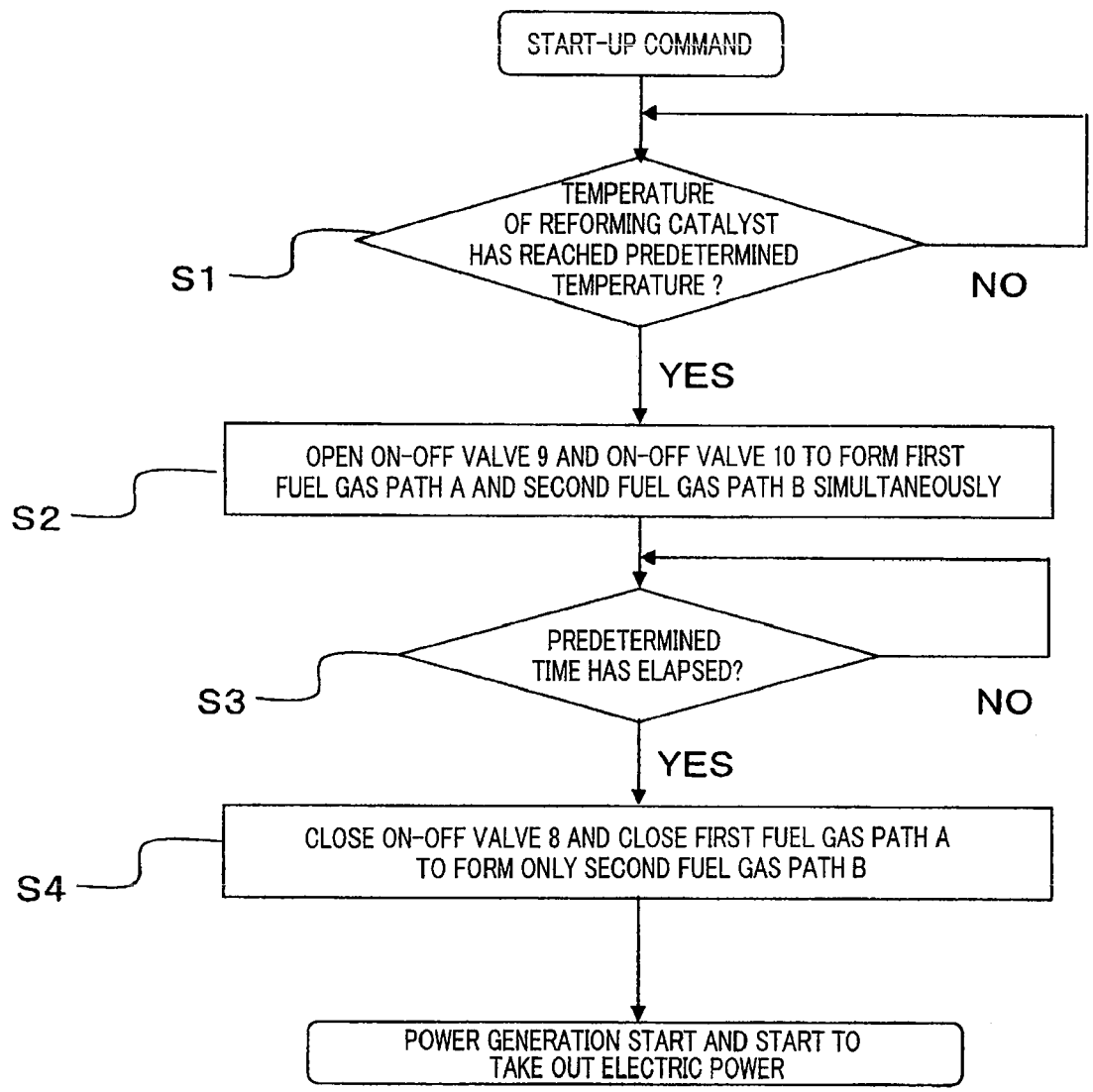
FIG. 2 is a flow diagram showing control at the time of start-up operation of the fuel cell system according to Embodiment 1 of the present invention.

The fuel cell system 100 of this embodiment performs the operation as described below under control of the controller 101. FIG. 2 is a control flow diagram showing the start-up operation of the fuel cell system 100 according to Embodiment 1 of the present invention.

Initially, at the time of start-up operation of the fuel cell system 100 of FIG. 1, the controller 101 causes the fuel gas generator 2 to operate to generate the hydrogen-rich fuel gas required in the power generation operation of the fuel cell 1. In this case, the on-off valves 7 and 8 are opened.

To be specific, the natural gas which is an example of the raw material used for generating hydrogen is supplied from the material supplier 11 to the reformer of the fuel gas generator 2 as shown in FIG. 1. To generate steam for enabling the steam reforming reaction to proceed, the water is supplied from an infrastructure such as a tap water to the reformer of the fuel gas generator 2. To enable the steam reforming reaction to proceed in the reformer of the fuel gas generator 2, the reforming catalyst provided in the reformer is heated by the combustion burner 2*a*.

In an initial stage of the start-up operation of the fuel cell system 100, the reforming catalyst temperature of the reformer in the fuel gas generator 2 increases gradually because of heating by the combustion burner 2*a* and therefore does not reach a predetermined temperature yet. For this reason, the steam reforming reaction does not suitably proceed in the reformer, and therefore the fuel gas exhausted from the fuel gas generator 2 contains carbon monoxide with a higher concentration than the fuel gas at the time of the power generation operation. The fuel gas containing the higher-concentration carbon monoxide than the fuel gas at the time of the power generation operation is referred to as a fuel gas containing a high-concentration carbon monoxide.

Accordingly, in Embodiment 1, at the start of the start-up operation of the fuel cell system 100, the controller 101 forms the fuel gas path A, until the reforming catalyst in the reformer of the fuel gas generator 2 reaches a predetermined temperature and the fuel gas generator 2 can generate a good-quality fuel gas (predetermined operation condition is satisfied). The fuel gas path A is formed by the first path R1, the second path R2 and the third path R3 in such a manner that the controller 101 opens the on-off valve 8 and closes the on-off valves 9 and 10 so as to connect the first path R1 and the second path R2 to each other and disconnect the first path R1 and the fourth path R4 from each other.

The fuel gas containing carbon monoxide and hydrogen which has been generated in the fuel gas generator 2, is supplied to the fuel gas path A. Thus, the fuel gas containing a high-concentration carbon monoxide is supplied to the combustion burner 2*a* via the fuel gas path A. The combustion burner 2*a* combusts the fuel gas containing a high-concentration carbon monoxide to heat the reforming catalyst in the reformer of the fuel gas generator 2. The reforming catalyst is heated up to a predetermined temperature suitable for the steam reforming reaction, about 650 to 800 degrees centigrade. The fuel gas combusted in the combustion burner 2*a* is exhausted to outside the fuel cell system 100 as an exhausted combustion gas.

To combust the fuel gas containing a high-concentration carbon monoxide in the combustion burner 2*a*, the combustion fan 2*b* supplies air to the combustion burner 2*a*. The amount of air supplied from the combustion fan 2*b* to the combustion burner 2*a* is suitably set according to the amount of the raw material such as the natural gas which is supplied from the material supplier 11 to the fuel gas generator 2.

Hereinafter, the amount of air supplied from the combustion fan 2*b* will be described in detail.

After the start of the power generation operation of the fuel cell system 100, in the reformer of the fuel gas generator 2, hydrogen is generated from the natural gas through a chemical reaction represented by a formula (1) theoretically:

$$CH_4 + 2H_2O \rightarrow CO_2 + 4H_2 \qquad (1)$$

When the amount of the natural gas supplied from the material supplier 11 to the fuel gas generator 2 is Q (L/min) for the convenience, the amount of hydrogen generated in the reformer of the fuel gas generator 2 is 4Q (L/min) according to the chemical reaction represented by the formula (1). Hydrogen with the same amount is supplied to the combustion burner 2a via the fuel gas path A.

To achieve complete combustion of hydrogen supplied with a rate of 4Q (L/min) from the fuel gas generator 2 to the combustion burner 2a via the fuel gas path A, it is necessary to supply oxygen with a rate of 2Q (L/min) theoretically from the combustion fan 2b to the combustion burner 2a to proceed the combustion reaction represented by a formula (2):

$$4H_2 + 2O_2 \rightarrow 4H_2O \qquad (2)$$

Assuming that the oxygen concentration in air is 20%, it is necessary to supply air with a rate of 10Q(L/min) theoretically. On the other hand, if the amount of air supplied to the combustion burner 2a is just 10Q (L/min) (oxygen supply amount 2Q (L/min)), incomplete combustion frequently occurs because of the characteristic of the combustion burner 2a. For this reason, in Embodiment 1, the air ratio is set to 1.5 and the amount of air supplied to the combustion burner 2a is set to 15Q (L/min) (the oxygen supply amount 3Q (L/min)) with the oxygen concentration being set to 20%), for ensuring combustion stability in the combustion burner 2a.

The term "air ratio" refers to a ratio of an actual air amount with respect to a theoretical air amount required for the complete combustion of the combustion fuel. In the above case, when air is supplied with a rate of 10Q (L/min) with respect to a natural gas supply amount Q (L/min), the air ratio is 1. The controller 101 controls the number of rotations of the combustion fan 2b so that the amount of air supplied to the combustion burner 2a is 15Q (L/min). Whereas the oxygen concentration in air is set to 20% as described above, difference in the air amount is only 5% if the oxygen concentration in air is set to 21%, and the same advantage is achieved. Hereinafter, it is supposed that the oxygen concentration is 20%.

That is, in this embodiment, the amount of air supplied from the combustion fan 2b to the combustion burner 2a is set based on the amount of hydrogen generated theoretically in the fuel gas generator 2, i.e., the amount of the natural gas supplied from the material supplier 11 to the reformer of the fuel gas generator 2. With this setting, the fuel gas containing a high-concentration carbon monoxide is combusted in the combustion burner 2a. The heat energy generated in the combustion burner 2a heats the reforming catalyst in the reformer of the fuel gas generator 2.

Then, as shown in FIG. 2, when the temperature of the reforming catalyst in the reformer of the fuel gas generator 2 increases by the heat generated by combusting the fuel gas containing a high-concentration carbon monoxide in the combustion burner 2a, the controller 101 determines whether or not the temperature of the reforming catalyst has reached a predetermined temperature suitable for the steam reforming reaction (step S1).

The temperature of the reforming catalyst is detected by, for example, a temperature sensor (not shown) buried in the reforming catalyst. The output signal of the temperature sensor is input to the controller 101. Then, the controller 101 analyzes the output signal to recognize the temperature of the reforming catalyst. If it is determined that the temperature of the reforming catalyst has not reached the predetermined temperature yet (NO in step S1), the combustion burner 2a continues to heat the reforming catalyst until the temperature of the reforming catalyst has reached the predetermined temperature.

On the other hand, if the controller 101 determines that the temperature of the reforming catalyst has reached the predetermined temperature in step S1 (YES in step S1), the fuel cell system 100 transitions to the operation in step S2 as described later.

Assuming that the controller 101 opens the on-off valve 9 and the on-off valve 10 and closes the on-off valve 8 to completely switch the path of the fuel gas exhausted from the fuel gas generator 2 from the fuel gas path A to the fuel gas path B as in the conventional fuel cell system, incomplete combustion may proceed in the combustion burner 2a as described above in the background art.

Hereinafter, the event that incomplete combustion occurs if the operation similar to that of the conventional fuel cell system is performed will be described specifically.

When the fuel gas path is switched from the fuel gas path A to the fuel gas path B as described above, the amount of the natural gas which has been exhausted (pushed out) from the fuel gas passage 1a of the fuel cell 1 or the like and supplied to the combustion burner 2a is approximately equal to the amount of the fuel gas supplied from the fuel gas generator 2 to the fuel gas passage 1a.

According to the formula (1), when the raw material (natural gas) supplied to the fuel gas generator 2 is Q (L/min), carbon dioxide of Q (L/min) and hydrogen of 4Q (L/min) are exhausted from the fuel gas generator 2 and the natural gas is exhausted (pushed out) to the combustion burner 2a at a rate of 5Q (L/min). As represented by a formula (3) illustrated below, to completely combust the natural gas supplied at a rate of 5Q (L/min) and convert the natural gas into carbon dioxide and water, the air supply amount of 50Q (L/min) (oxygen supply amount 10Q (L/min)) (air ratio 1) to the combustion burner 2a is required:

$$5CH_4 + 10O_2 \rightarrow 5CO_2 + 10H_2O \qquad (3)$$

Since methane concentration in the natural gas pre-filled is 90%, the amount 5Q (L/min) of the natural gas pushed out can be calculated as being approximately equal to a volume 5Q of methane.

On the other hand, at the time of the start-up operation of the fuel cell system 100 of Embodiment 1, the flow rate of air supplied is controlled to be 15Q (L/min) (oxygen supply amount 3Q (L/Q)) so that the air ratio in the combustion burner 2a is 1.5.

Therefore, when the natural gas is supplied at a rate of 5Q (L/min) to the combustion burner 2a by completely switching the fuel gas path from the fuel gas path A to the fuel gas path B, incomplete combustion may occur, and carbon monoxide may be exhausted from the fuel cell system 100, because the air ratio in the combustion burner 2a is 0.3.

In view of the above, in Embodiment 1, before switching the fuel gas path from the fuel gas path A to the fuel gas path B, the controller 101 executes control so that the fuel gas branches to flow to the fuel gas path A and to the fuel gas path B in step S2. To cause the fuel gas to branch to flow in this manner, the fuel gas path A and the fuel gas path B are formed simultaneously by opening the on-off valve 8, the on-off valve 9, and the on-off valve 10 so that the fuel gas exhausted from the fuel gas generator 2 branches so as to flow from the first path R1 to the second path R2 and to the fourth path R4, is joined at the third path R3, and then is supplied to the combustion burner 2a.

After an elapse of a predetermined time in step S3 as described later, the fuel cell system 100 transitions to the operation in step S4 in which the fuel gas path is completely switched to the fuel gas path B as described later.

In the fuel cell system 100 of this Embodiment, the passage resistance of the fuel gas path A and the passage resistance of the fuel gas path B are preset so that the fuel gas exhausted from the fuel gas generator 2 branches to flow to the fuel gas path A and to the fuel gas path B in a flow rate ratio of n:(1−n) (0<n<1) in step S2.

In this case, when the natural gas supplied to the fuel gas generator 2 is Q (L/min), carbon dioxide of Q (L/min) and hydrogen of 4Q (L/min) are exhausted from the fuel gas generator as described above, and therefore the fuel gas of 5Q (L/min) is exhausted from the fuel gas generator. Of this fuel gas, the fuel gas of 5nQ (L/min) (H$_2$:4nQ (L/min), CO$_2$:nQ (L/min)) is directly supplied to the combustion burner 2a via the fuel gas path A.

Meanwhile, since 5(1−n)Q (L/min) is supplied to the fuel gas passage 1a of the fuel cell 1 via the fuel gas path B, the natural gas is substantially supplied to the combustion burner 2a. In this case, the air supply amount required to ensure the air ratio 1.0 in the combustion burner 2a is 5(10−8n)Q (L/min) (oxygen supply amount (10−8n)Q (L/min)) as indicated by a formula (4) and a formula (5):

$$4nQH_2 + 2nQO_2 \rightarrow 4nQH_2O \tag{4}$$

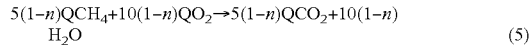

$$5(1-n)QCH_4 + 10(1-n)QO_2 \rightarrow 5(1-n)QCO_2 + 10(1-n)H_2O \tag{5}$$

When the air ratio is set to, for example, 1.2 to ensure combustion stability in the combustion burner 2a, the air supply amount of 6(10−8n)Q (L/min) (oxygen supply amount 1.2 (10−8n)Q (L/min)) is necessary.

On the other hand, as described above, at the start of the start-up operation of the fuel cell system 100 in Embodiment 1, the amount of air supplied to the combustion burner 2a is 15Q (L/min). Therefore, by setting the passage resistance of the fuel gas path A and the passage resistance of the fuel gas path B to satisfy 6(10−8n)Q≦15Q, that is, n≧0.9375 in the case where the first flow rate controller and the second flow rate controller of the present invention are on-off valves like this Embodiment, incomplete combustion in the combustion burner 2a can be prevented. That is, the structures of the fuel gas supply path 22, the bypass path 24, the off-gas path 23, the fuel gas passage 1a and the fuel gas passages inside the fuel cell are designed to satisfy n≧0.9375. Step S2 is an example of a flow dividing step of the present invention.

The controller 101 executes control so that the fuel gas flows to the fuel gas path A and to the fuel gas path B in step S2. This state is maintained until a predetermined time elapses in step S3.

The above described "predetermined time" in step S3 in which it is determined as YES is a time required to replace the natural gas filled in the passages in the vicinity of the fuel cell 1 (a portion of the fourth passage R4, the fuel gas passage 1a and a portion of the fifth passage R5, which are located between the on-off valve 9 and the on-off valve 10), by the fuel gas.

Subsequently, the time required to replace the natural gas by the fuel gas will be described.

When the internal volume of a portion the fuel gas path B which is located between the on-off valve 9 and the on-off valve 10 shown in FIG. 1 is V(L), the flow rate of the natural gas supplied to the fuel gas generator 2 is Q (L/min) as described above, and the flow rate of the fuel gas which is exhausted from the fuel gas generator 2 and branches to flow to the fuel gas passage B in step S2 is 5(1−n)Q (L/min) as described above.

Therefore the time can be defined as T (min) calculated according to a formula (6):

$$T \geqq V/5(1-n)Q \tag{6}$$

Subsequently, the reason why the air ratio for ensuring the combustion stability in the combustion burner 2a is set to 1.2 as described above will be explained.

As described above, in Embodiment 1, at the start of the power generation operation of the fuel cell 1, the amount of air supplied to the combustion burner 2a is 15Q. Meanwhile, the air supply amount required to combust with an air ratio a the natural gas which is exhausted from the fuel gas passage 1a of the fuel cell 1 or the like and supplied to the combustion burner 2a is 5a (10−8n)Q.

Therefore, when the air ratio a is set, it is necessary to set the flow rate ratio n:(1−n) (0<n<1) with which the fuel gas branches to flow to the fuel gas path A and the fuel gas path B under the condition indicated by a formula (7):

$$5a(10-8n)Q \leqq 15Q \tag{7}$$

Whereas the combustion stability in the combustion burner 2a is further improved by setting the air ratio a to a value close to 1.5, n is close to 1 according to a formula (7) and therefore the "predetermined time" T (min) indicated by the formula (6) is long. On the other hand, the incomplete combustion is likely to occur by setting the air ratio close to 1.0. For these reasons, the air ratio a is set to a value 1.2.

After the controller 101 determines that the predetermined time has elapsed in step S3, the fuel gas path A is closed in step S4 and the fuel gas is supplied from the fuel gas generator 2 to the fuel cell 1 via the fuel gas path B. In this state, the fuel cell 1 starts the power generation operation as described below.

The fuel gas generator 2 supplies the fuel gas, the carbon monoxide concentration of which has been reduced sufficiently, is supplied to the fuel gas passage 1a of the fuel cell 1, and the blower 3 supplies air to the oxidizing gas passage 1b of the fuel cell 1. The fuel cell 1 carries out power generation using the fuel gas supplied to an anode side and air supplied to a cathode side, to output a predetermined electric power.

The off-gas which has not been used in the power generation is exhausted from the fuel gas passage 1a of the fuel cell 1 and then is supplied to the combustion burner 2a via the fifth path R5 and the third path R3. The off-gas is combusted in the combustion burner 2a to proceed the steam reforming reaction. The air which is exhausted from the oxidizing gas passage 1b of the fuel cell 1 is exhausted to outside the fuel cell system 100.

As should be appreciated from the above, in this Embodiment, in the fuel cell system in which the raw material is filled inside the fuel cell, the fuel gas path is not completely switched from the fuel gas path A to the fuel gas path B immediately after the temperature of the reformer has reached the predetermined temperature, but the fuel gas is caused to be divided to flow to these paths. This makes it possible to effectively suppress exhausting of carbon monoxide from the combustor.

By suppressing exhausting of carbon monoxide, it is possible to provide a fuel cell system which is environmentally-friendly.

In addition, since the air ratio in the combustion burner 2a is controlled to be 1 or larger, combustion in the combustion burner can be stabilized.

Since the purging is performed using the raw material used during the operation of the fuel cell system to prevent degradation of performance of the fuel cell during the stop state, it is not necessary to provide other inert gas supply means. Thus, it is possible to install the fuel cell system at a low cost and in a small scale.

An example of the predetermined time of the present invention is the time T determined based on the formula (6) in this embodiment. The predetermined time T may be determined based on an electric potential difference between the anode and the cathode of the fuel cell 1.

To be specific, when the fuel cell 1 performs power generation to output a predetermined electric power, an electric potential difference is generated between the anode and the cathode of the fuel cell 1. When the electric potential difference is expressed as U(V), the above described "predetermined time" in step S3 in which it is determined as YES may be a time which elapses until U(V) has reached a predetermined electric potential difference Us(V).

Us(V) is the electric potential difference U(V) between the anode and the cathode of the fuel cell 1 which is generated when the natural gas within the fuel gas passage 1a of the fuel cell 1 has been completely replaced by the fuel gas, the carbon monoxide concentration of which has been sufficiently reduced, and the blower 3 supplies air to the oxidizing gas passage 1b of the fuel cell 1. The specific value of Us(V) may be about 40V when the fuel cell 1 is composed of 50 polymer electrolyte membranes, for example.

Figure 9:
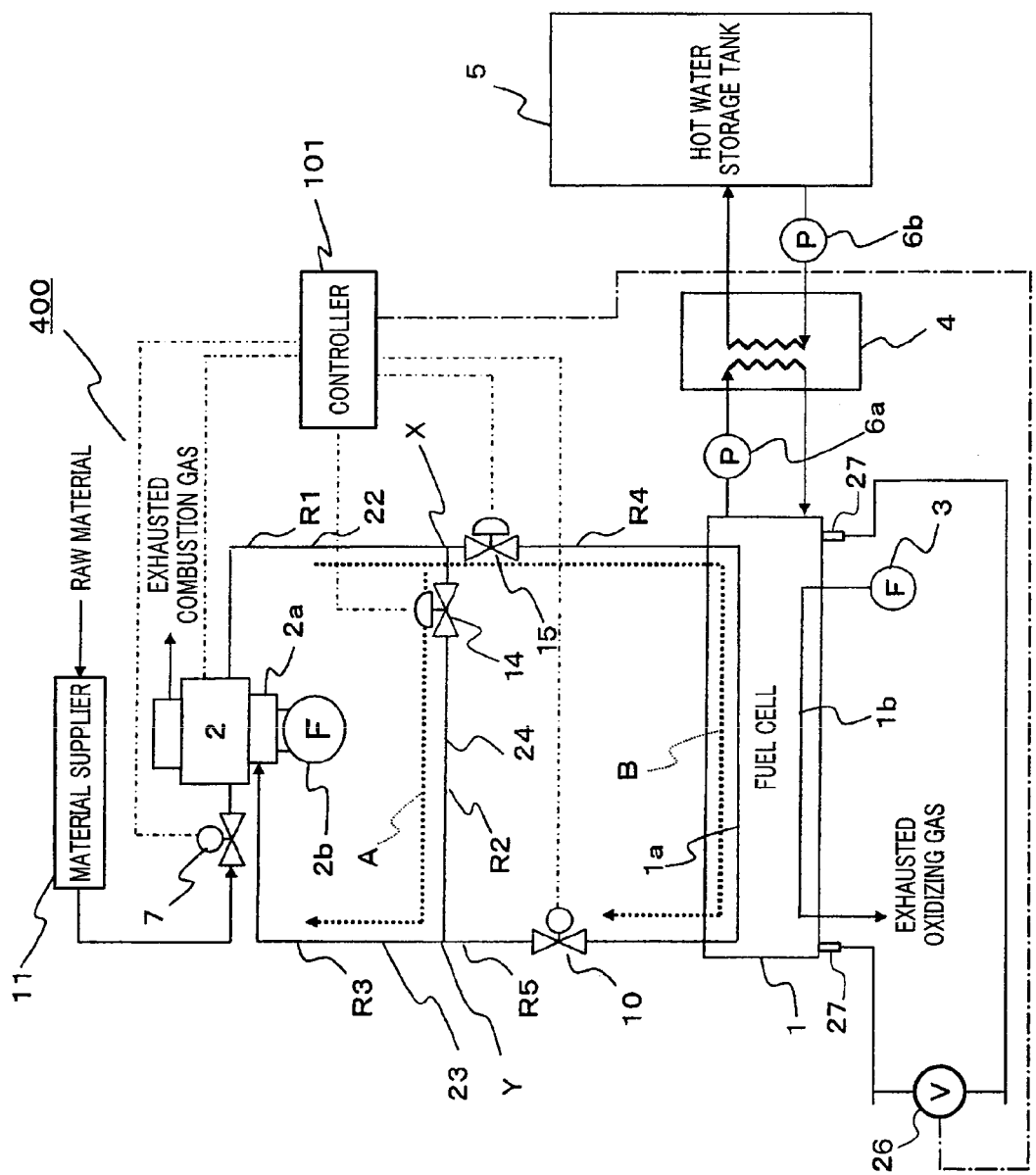
FIG. 9 is a block diagram schematically showing a configuration of a fuel cell system according to modification 2 of Embodiment 4 of the present invention.
Figure 10:
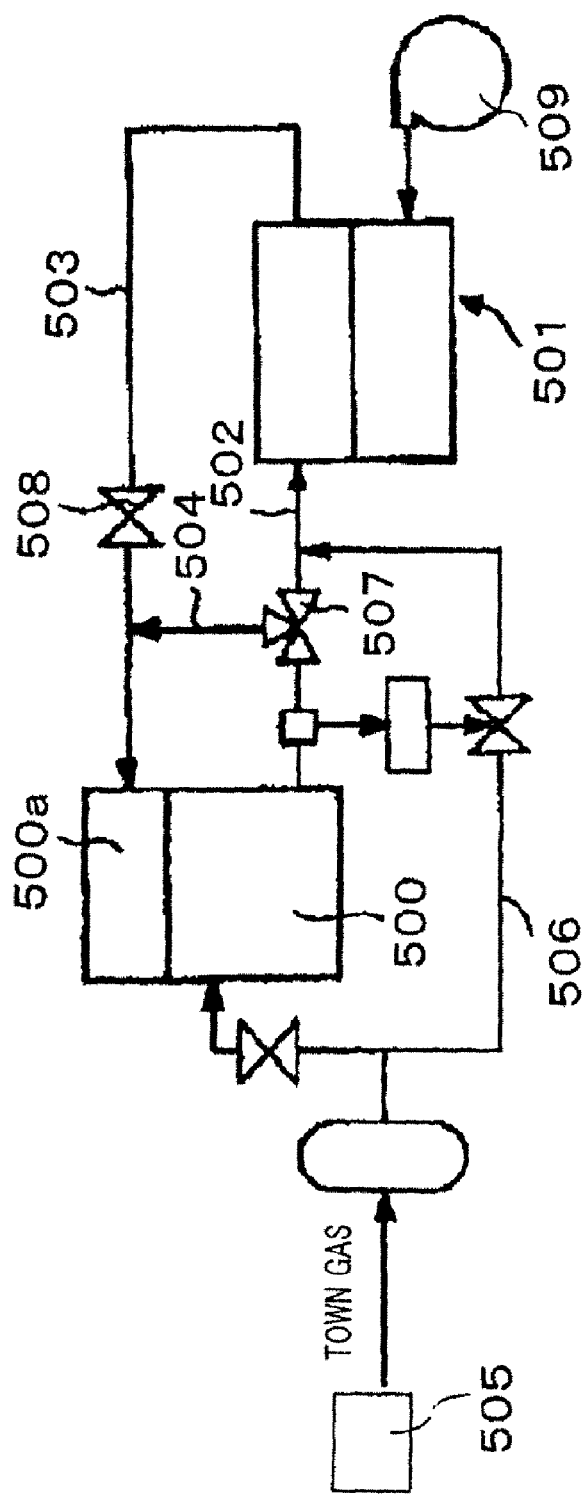
FIG. 10 is a block diagram schematically showing a configuration of the conventional fuel cell system.

A voltage detector 26 (described in detail in modification 2 of Embodiment 4) shown in FIG. 9 detects the electric potential difference U(V) between the anode and the cathode of the fuel cell 1. When U(V) has reached Us(V), the natural gas present in the vicinity of the fuel gas passage 1a of the fuel cell 1 (a portion of the fourth path R4, the fuel gas passage 1a and a portion of the fifth path R5, which are located between the on-off valve 9 and the on-off valve 10) is completely pushed out by the fuel gas, the carbon monoxide concentration of which has been sufficiently reduced, flows through the fifth path R5 and the third path R3, and is combusted in the combustion burner 2a.

Therefore, by closing the on-off valve 8 at the time point when U(V) has reached Us(V), stable combustion in the combustion burner 2a is not degraded if all of the fuel gas exhausted from the fuel gas generator 2 is flowed to the fuel gas path B. Whereas in the above Embodiment, the blower 3 supplies the air to the oxidizing gas passage 1b after the fuel gas path A is completely closed in step S4, it supplies air to the fuel cell 1 in step S2 of FIG. 2 when the electric potential difference of the fuel cell is detected in this way.

In this Embodiment, the amount of air supplied from the combustion fan 2b to the combustion burner 2a is maintained constant before and after switching from the fuel gas path A to the fuel gas path B. Alternatively, the air supply amount may be controlled to be increased by increasing the number of rotations of the combustion fan 2b when the fuel gas path is switched from the fuel gas path A to the fuel gas path B. However, if the number of rotations of the fan 2b is increased, a noise is generated. On the other hand, the fuel cell system of this Embodiment is capable of suppressing generation of carbon monoxide at the start of the start-up operation without generating a noise, and therefore is advantageous to home use or the like.

Embodiment 2

Hereinafter, a fuel cell system according to Embodiment 2 of the present invention will be described.

Figure 3:
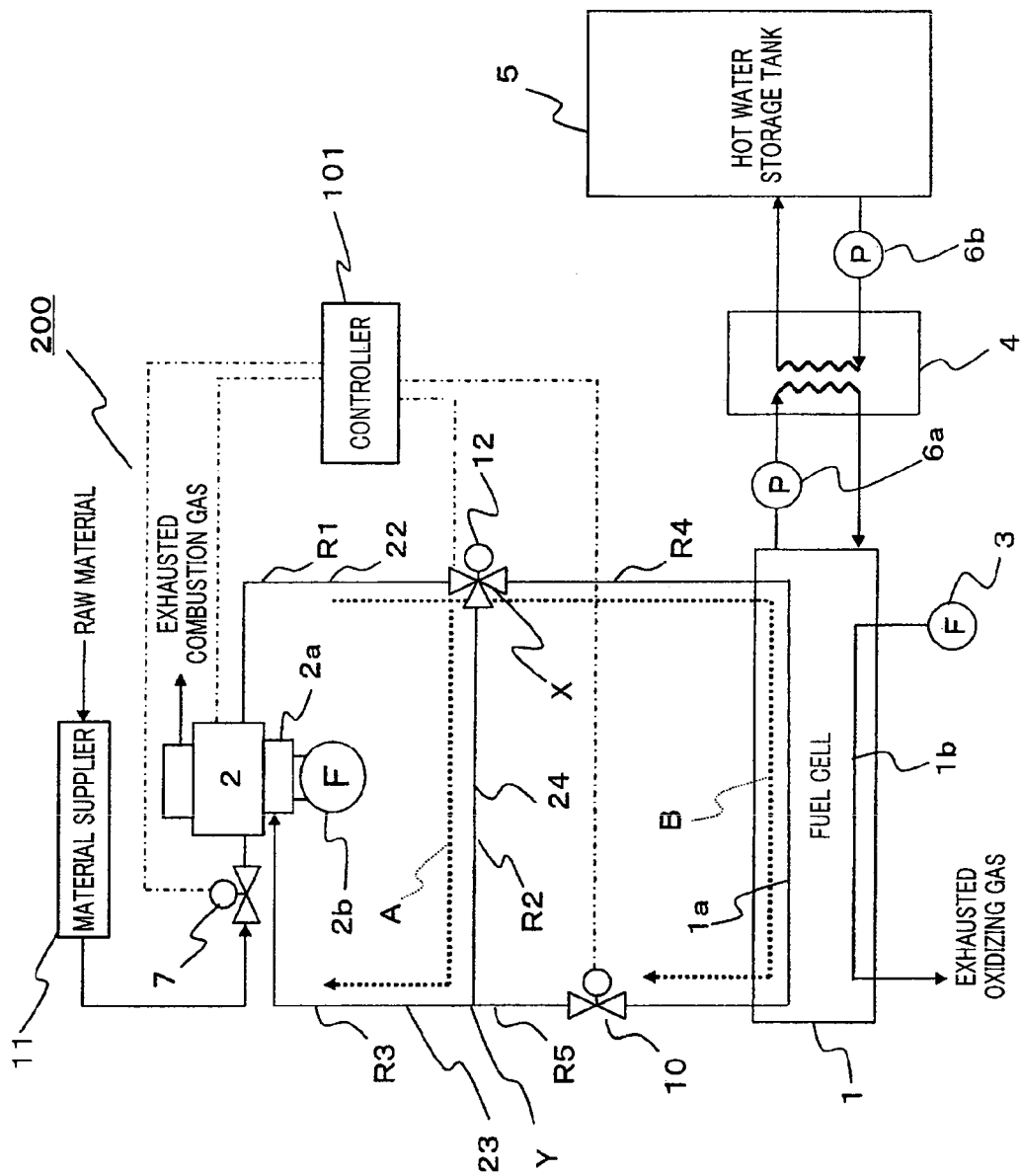
FIG. 3 is a block diagram schematically showing a configuration of a fuel cell system according to Embodiment 2 of the present invention.

FIG. 3 is a block diagram schematically showing a configuration of a fuel cell system 200 according to Embodiment 2 of the present invention. In FIG. 3, also, solid lines connecting components in the fuel cell system indicate the paths through which the water, the fuel gas, the oxidizing gas, etc flow. In addition, arrows depicted on these solid lines indicate the flow directions in which the water, the fuel gas, the oxidizing gas, etc flow at the time of a normal operation. In FIG. 3, also, only the components required to describe the present invention are illustrated and the other components are omitted. In FIG. 3, the same components as those in the fuel cell system 100 shown in Embodiment 1 are designated by the same reference numerals.

As shown in FIG. 3, the configuration of the fuel cell system 200 is basically the same as the configuration of the fuel cell system 100 shown in Embodiment 1, but is different from the same in that the on-off valve 8 and the on-off valve 9 of FIG. 1 are omitted but instead a flow divider 12 is provided as shown in FIG. 3. In other respect, the configuration of the fuel cell system 200 is identical to the configuration of the fuel cell system 100 illustrated in Embodiment 1, and therefore a difference between them will be in large part described.

As described above, the fuel cell system 200 includes the flow divider 12 provided at the branch portion X where the first path R1 branches into the second path R2 and the third path R3. The controller 101 controls the flow divider 12 instead of the on-off valve 8 and the on-off valve 9 of Embodiment 1. The controller 101 controls the flow divider 12, thereby adjusting the flow rate ratio with which the fuel gas exhausted from the fuel gas generator 2 branches to flow to the fuel gas path A and to the fuel gas path B.

As described in Embodiment 1, the flow rate ratio with which the fuel gas exhausted from the fuel gas generator 2 branches to flow to the fuel gas path A and the fuel gas path B depends on the magnitude relationship between the passage resistance of the fuel gas path A and the passage resistance of the fuel gas path B. For this reason, when the fuel gas path A and the fuel gas B are formed simultaneously, in a case where the passage resistance of the fuel gas path A is much larger than the passage resistance of the fuel gas path B in the fuel cell system 100, the amount of the natural gas which is pushed out from the fuel gas passage 1a of the fuel cell 1 and the passages in the vicinity of the fuel gas passage 1a and is supplied to the combustion burner 2a is increased and the oxygen supply amount required to conduct stable combustion is insufficient, causing a possibility that the incomplete combustion occurs.

Accordingly, in the fuel cell system 200 of Embodiment 2, as shown in FIG. 3, the flow divider 12 is capable of adjusting, as desired, the flow rate ratio with which the fuel gas exhausted from the fuel gas generator 2 branches to flow to the fuel gas path A and the fuel gas path B. Therefore, stability of combustion in the combustion burner 2a is expected.

To be specific, as in Embodiment 1, the controller 101 controls the flow divider 12 so that $n \geq 0.9375$ is satisfied when the flow rate ratio with which the fuel gas exhausted from the fuel gas generator 2 branches to flow to the fuel gas path A and to the fuel gas path B is $n:(1-n)(0<n<1)$. With this control, the air ratio in the combustion burner 2a in the case where the natural gas is exhausted (pushed out) from the fuel gas passage 1a of the fuel cell 1 or the like and is supplied to the combustion burner 2a is 1.2 or larger, making it possible to ensure stable combustion in the combustion burner 2a.

Figure 4:
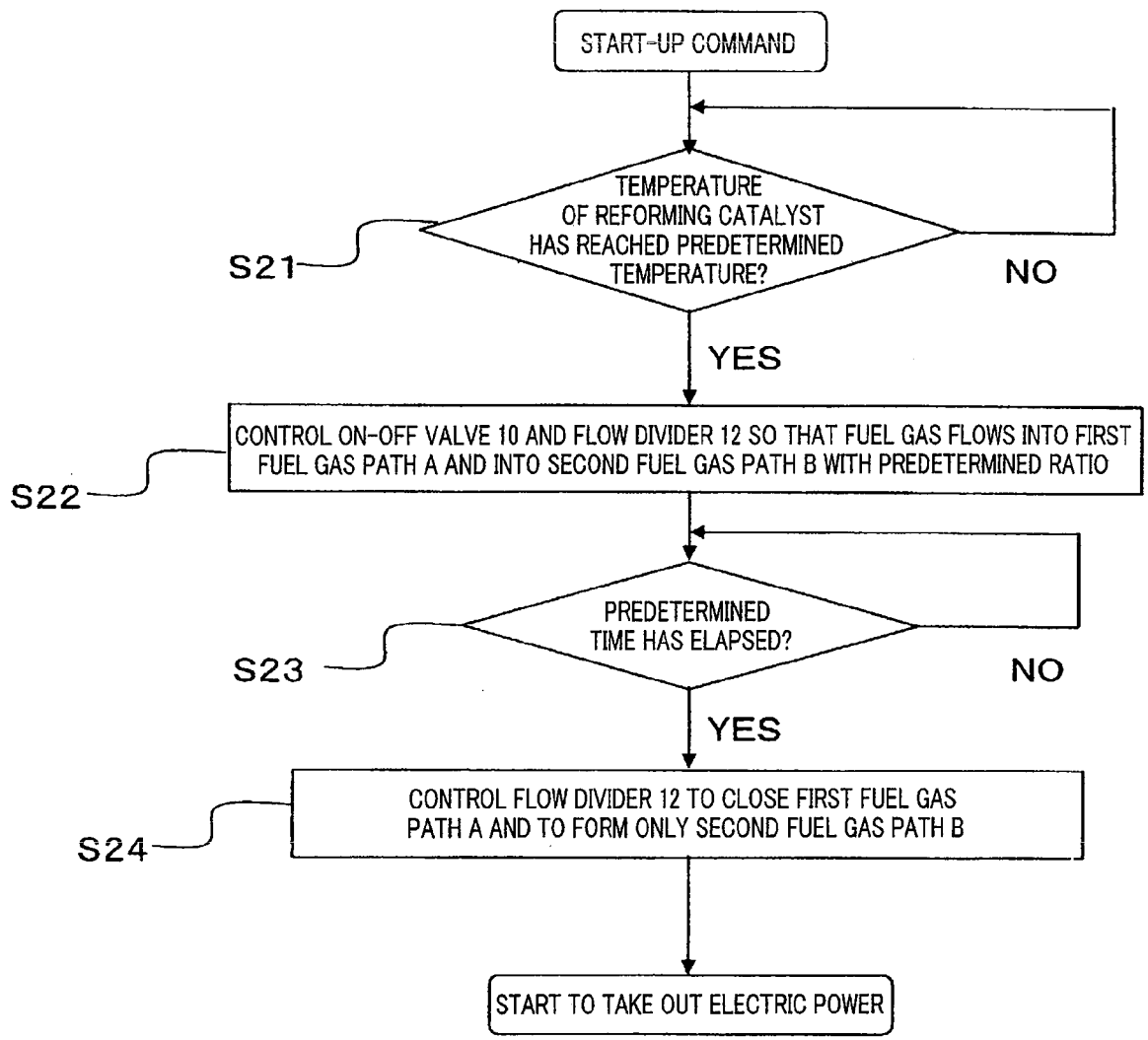
FIG. 4 is a flow diagram showing control at the time of start-up operation of the fuel cell system according to Embodiment 2 of the present invention.

Hereinafter, the operation of the fuel cell system 200 of Embodiment 2 will be described. FIG. 4 is a flow diagram showing control at the time of start-up operation of the fuel cell system 200 according to Embodiment 2 of the present invention.

As shown in FIG. 4, as in Embodiment 1, in Embodiment 2, when the controller 101 determines that the temperature of the reforming catalyst has reached the predetermined temperature in step S21 (YES in step S21), the operation of the fuel cell system 200 transitions to step S22 described below.

Then, in step S22, the controller 101 opens the on-off valve 10 and causes the flow divider 12 to be half-open, forming the fuel gas path A and the fuel gas path B simultaneously. With this control, the fuel gas which is exhausted from the fuel gas generator 2 branches at the branch portion X to flow to the second path R2 and to the fourth path R4, is joined at the junction portion Y, and is supplied to the combustion burner 2*a*. In this case, the flow divider 12 is controlled so that $n \geq 0.9375$ is satisfied when the flow rate ratio with which the fuel gas exhausted from the fuel gas generator 2 branches to flow to the fuel gas path A and to the fuel gas path B is $n:(1-n)(0<n<1)$ as described above. Step S2 is an example of the flow dividing step of the present invention.

Then, when the timer unit of the controller 101 determines that a predetermined time taken to exhaust all of the natural gas from the fuel gas passage 1*a* of the fuel cell 1 or the like and combust all of the natural gas in the combustion burner 2*a* has elapsed (YES in step S23), the operation of the fuel cell system 200 transitions to step S24. In step S24, the controller 101 causes the flow divider 12 to operate to disconnect the first path R1 and the first path R2 from each other so that all of the fuel gas exhausted from the fuel gas generator 2 flows to the fuel gas path B.

The above described "predetermined time" in step S23 in which it is determined as YES is defined by the above illustrated formula (6) as in Embodiment 1. As in Embodiment 1, when the fuel gas is supplied from the fuel gas generator 2 to the fuel cell 1, the fuel cell 1 starts the power generation operation, in step S22 and the following steps.

As should be appreciated from the above, in the fuel cell system of Embodiment 2, it is possible to suppress exhausting of carbon monoxide as in Embodiment 1.

In addition, in the fuel cell system of Embodiment 2, since the flow divider 12 is capable of achieving desired passage resistances even when the fuel gas path A and the fuel gas path B are not designed to have desired passage resistances. Therefore, the fuel cell system of Embodiment 2 is applicable to equipment of the existing fuel cell system.

In the same manner as that described above in Embodiment 1, when the electric potential difference generated between the anode and the cathode of the fuel cell 1 when the fuel cell 1 carries out power generation to output a predetermined electric power is expressed as U(V), the above described predetermined time in step S23 in which it is determined as YES may be time which elapses until U(V) has reached the electric potential difference Us (V) shown in Embodiment 1.

Embodiment 3

Hereinafter, a fuel cell system according to Embodiment 3 of the present invention will be described.

Figure 5:
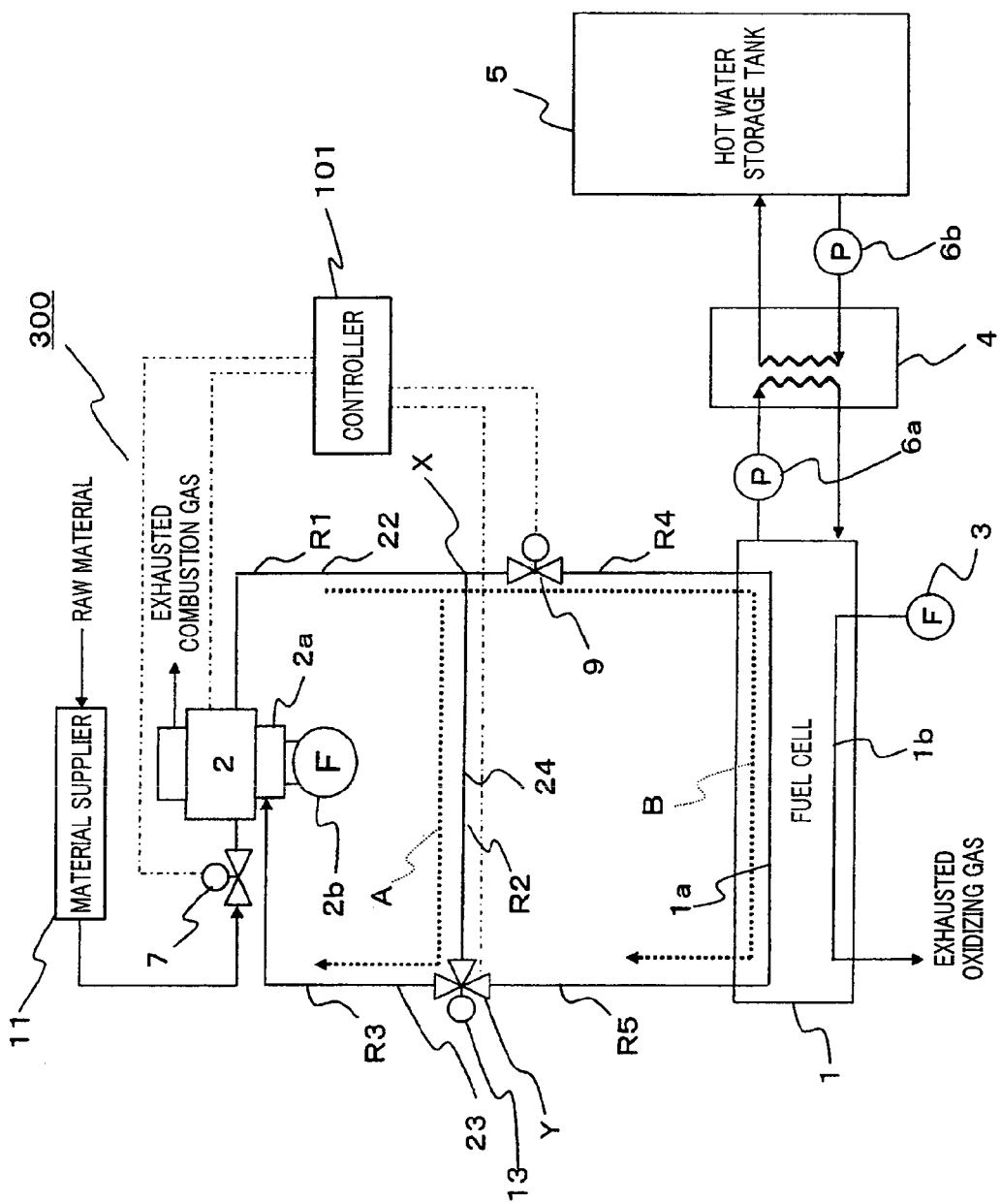
FIG. 5 is a block diagram schematically showing a configuration of a fuel cell system according to Embodiment 3 of the present invention.

FIG. 5 is a block diagram schematically showing a configuration of a fuel cell system 300 according to Embodiment 3 of the present invention. In FIG. 5, also, solid lines connecting components in the fuel cell system indicate the paths through which the water, the fuel gas, the oxidizing gas, etc flow. In addition, arrows depicted on these solid lines indicate the flow directions in which the water, the fuel gas, the oxidizing gas, etc flow, at the time of a normal operation. In FIG. 5, also, only the components required to describe the present invention are illustrated and the other components are omitted. In FIG. 5, the same components as those in the fuel cell system 100 shown in Embodiment 1 are designated by the same reference numerals.

Figure 6:
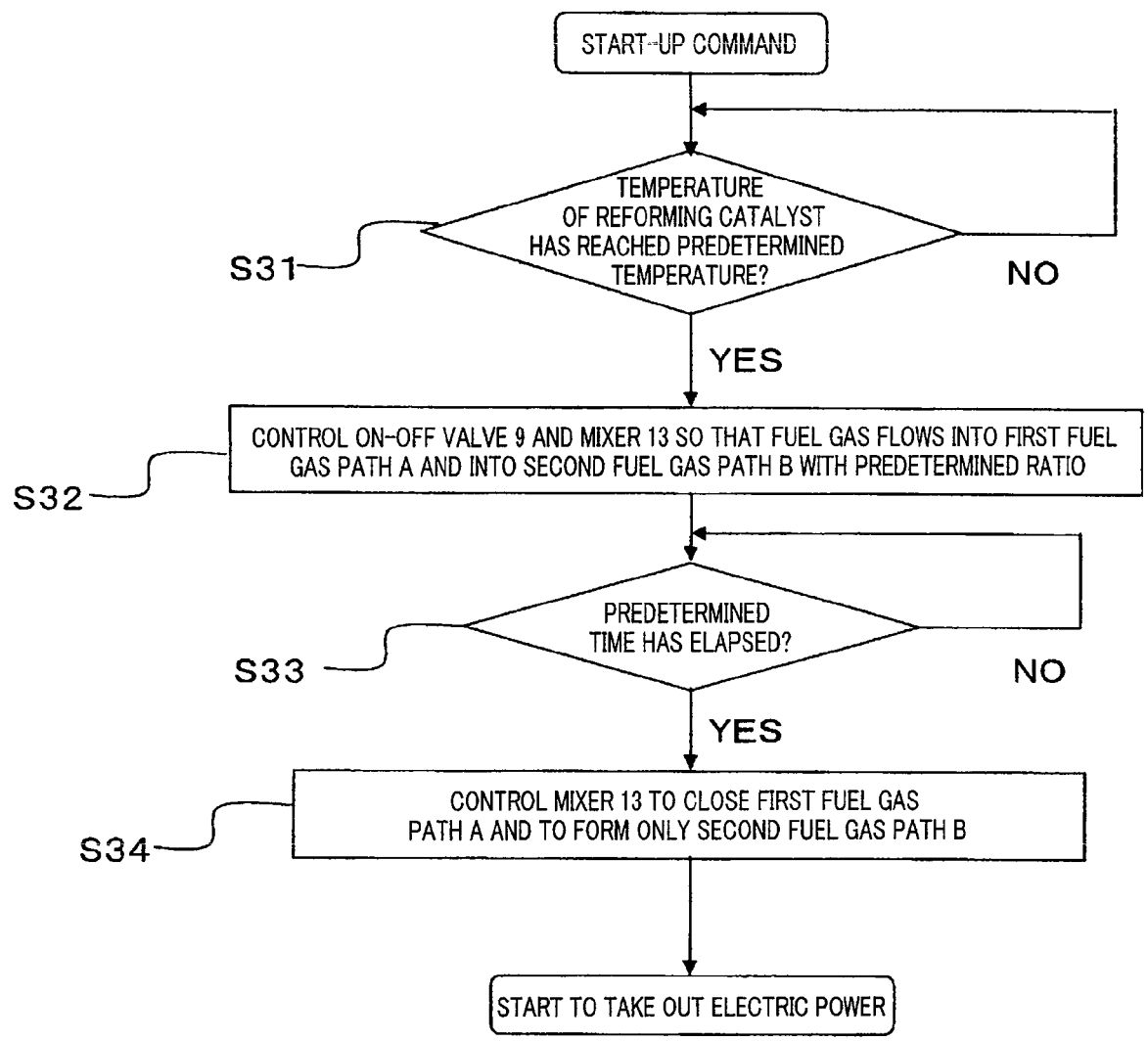
FIG. 6 is a flow diagram showing control at the time of start-up operation of the fuel cell system according to Embodiment 3 of the present invention.

As shown in FIG. 5, the configuration of the fuel cell system 300 is basically the same as the configuration of the fuel cell system 100 shown in Embodiment 1, but is different from the same in that the on-off valve 8 and the on-off valve 10 of FIG. 1 are omitted but instead a mixer 13 is provided as shown in FIG. 6. In other respect, the configuration of the fuel cell system 300 is identical to the configuration of the fuel cell system 100 illustrated in Embodiment 1, and therefore a difference between them will be in large part described.

As described above, the fuel cell system 300 includes the mixer 13 provided at the junction portion Y where the second path R2 and the fifth path R5 are joined to the third path R3. The controller 101 controls the mixer 13 instead of the on-off valve 8 and the on-off valve 9 illustrated in Embodiment 1. The controller 101 controls the mixer 13 to control a flow rate ratio between the fuel gas exhausted from the fuel gas generator 12 and flowing to the fuel gas path A and the fuel gas exhausted from the fuel gas generator 12 and flowing to the fuel gas path B.

In Embodiment 1, as shown in FIG. 1, the flow rate ratio with which the fuel gas exhausted from the fuel gas generator 2 branches to flow to the fuel gas path A and to the fuel gas path B depends on the magnitude relationship between the passage resistance of the fuel gas path A and the passage resistance of the fuel gas path B.

For this reason, when the fuel gas path A and the fuel gas path B are formed simultaneously, in a case where the passage resistance of the fuel gas path A is much larger than the passage resistance of the fuel gas path B in the fuel cell system 100, the amount of the natural gas which is pushed out from the fuel gas passage 1*a* of the fuel cell 1 and the passages in the vicinity of the fuel gas passage 1*a* and is supplied to the combustion burner 2*a* is increased and the oxygen supply amount required to conduct stable combustion is insufficient, causing a possibility that the incomplete combustion occurs.

In the fuel cell system of Embodiment 3, as shown in FIG. 5, the mixer 13 is capable of controlling, as desired, the flow rate ratio with which the fuel gas exhausted from the fuel gas generator 2 branches to flow to the fuel gas path A and to the fuel gas path B. Therefore, stability of combustion in the combustion burner 2*a* is expected.

To be specific, as in Embodiment 1, the controller 101 controls the mixer 13 so that $n \geq 0.9375$ is satisfied when the flow rate ratio with which the fuel gas exhausted from the fuel gas generator 2 branches to flow to the fuel gas path A and to the fuel gas path B is $n:(1-n)(0<n<1)$. With this control, the air ratio in the combustion burner 2*a* in the case where the natural gas is exhausted (pushed out) from the fuel gas passage 1*a* of the fuel cell 1 or the like and is supplied to the combustion burner 2*a* is 1.2 or larger, making it possible to ensure stable combustion in the combustion burner 2*a*.

Hereinafter, the operation of the fuel cell system 300 of Embodiment 3 of the present invention will be described.

FIG. 6 is a flow diagram showing control at the time of start-up operation of the fuel cell system 300 according to Embodiment 3 of the present invention.

As shown in FIG. 6, as in Embodiment 1, in Embodiment 3, when the controller 101 determines that the temperature of the reforming catalyst has reached the predetermined temperature in step S31 (YES in step S31), the operation of the fuel cell system 300 transitions to step S32 as described below.

Then, in step S32, the controller 101 opens the on-off valve 9 and causes the mixer 13 to be half-open, forming the fuel gas path A and the fuel gas path B simultaneously. With this control, the fuel gas which is exhausted from the fuel gas generator 2 branches at the branch portion X so as to flow to the second path R2 and to the fourth path R4, is joined at the junction portion Y, and is supplied to the combustion burner 2a. In this case, as described above, the mixer 13 is controlled so that n≧0.9375 is satisfied when the flow rate ratio with which the fuel gas exhausted from the fuel gas generator 2 branches to flow to the fuel gas path A and to the fuel gas path B is n:(1−n)(0<n<1). Step S32 is an example of a flow dividing step of the present invention.

Then, when the timer unit of the controller 101 determines that a predetermined time taken to exhaust all of the natural gas from the fuel gas passage 1a of the fuel cell 1 or the like and combust all of the natural gas in the combustion burner 2a has elapsed (YES in step S33), the operation of the fuel cell system 300 transitions to step S34. In step S34, the controller 101 causes the mixer 13 to operate to disconnect the second path R2 and the fifth path R5 from each other so that all of the fuel gas exhausted from the fuel gas generator 2 flows into the fuel gas path B (step S34).

The above described "predetermined time" in step S33 in which it is determined as YES is defined by the formula (6) as in Embodiment 1. As in Embodiment 1, when the fuel gas is supplied from the fuel gas generator 2 to the fuel cell 1, the fuel cell 1 starts the power generation operation, in step S32 and the following step.

As in Embodiment 1, when the electric potential difference generated between the anode and the cathode of the fuel cell 1 when the fuel cell 1 carries out power generation to output a predetermined electric power is expressed as U(V), the above described predetermined time in step S33 in which it is determined as YES may be time which elapses until U(V) has reached the electric potential difference Us (V) shown in Embodiment 1.

Embodiment 4

Figure 7:
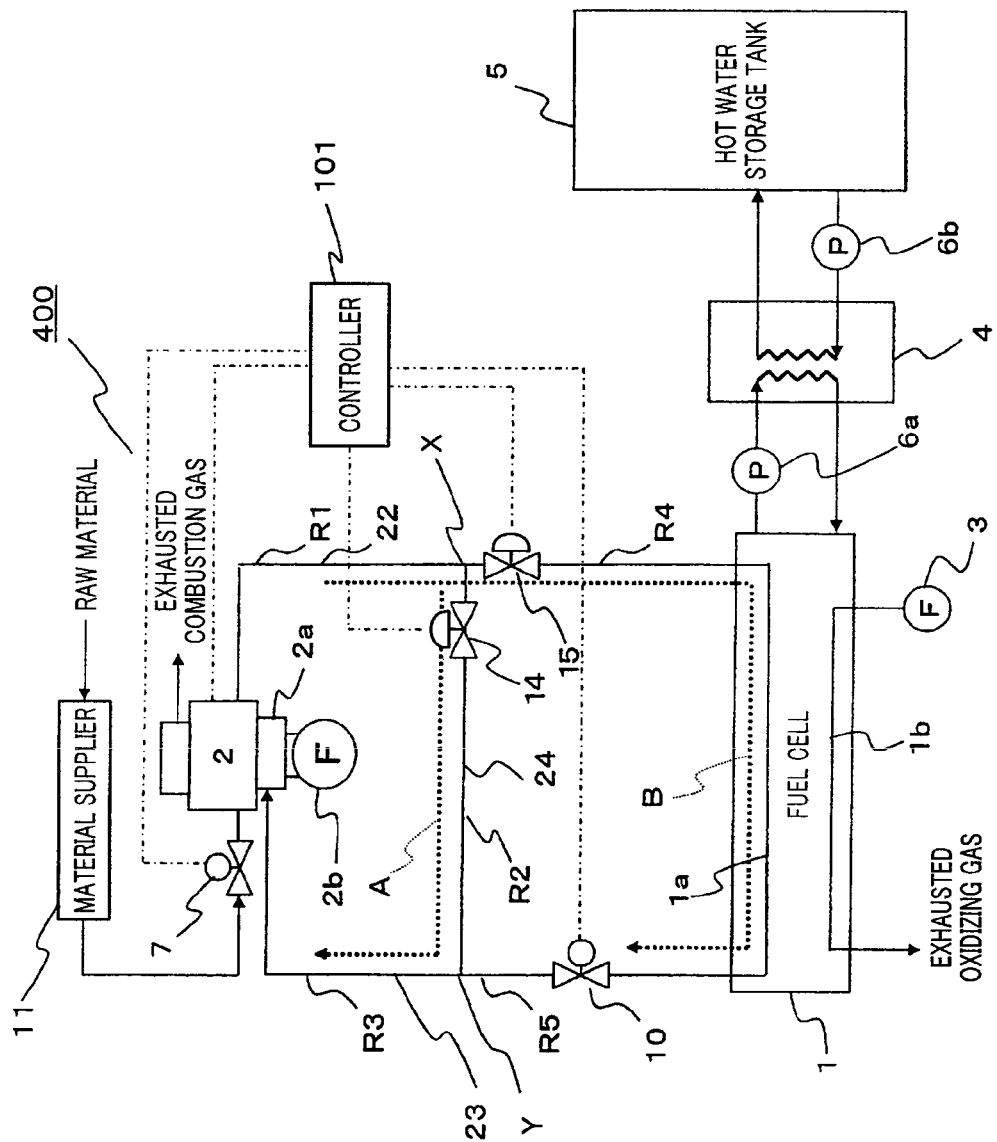
FIG. 7 is a block diagram schematically showing a configuration of a fuel cell system according to Embodiment 4 of the present invention.

FIG. 7 is a block diagram schematically showing a configuration of a fuel cell system 400 according to Embodiment 4 of the present invention. In FIG. 7, the same components as those in FIG. 1 are designated by the same reference numerals and will not be described.

In Embodiment 1, the passages are designed to achieve desired passage resistances and the flow rate controller for causing the fuel gas to branch is constituted by the on-off valves 8, 9, and 10, while in Embodiment 5, flow-rate control valves 14 and 15 are provided instead of the on-off valves 8 and 9. The flow rate control valves 14 and 15 are constituted by, for example, needle valves capable of controlling the flow rates by adjusting their opening degrees, for example. The controller 101 controls the opening degrees of the flow rate control valves 14 and 15 to achieve the flow rate ratio with which the fuel gas branches to flow to the fuel gas path A and to the fuel gas path B as described in Embodiment 1. In other respect, Embodiment 4 is identical to Embodiment 1.

In accordance with this Embodiment, since desired passage resistances are created by adjusting the opening degrees of the flow rate control valves 14 and 15, the flow rate ratio between the fuel gas flowing to the fuel gas path A and the fuel gas flowing to the fuel gas path B can be adjusted by adjusting the opening degrees of the flow rate control valves 14 and 15. Since it is not necessary to design the passage resistances of the passages in the fuel cell system 40 to achieve the desired flow rate ratio, flexibility of design is improved. In addition, the present invention is applicable to the existing fuel cell system.

Subsequently, modifications of this Embodiment will be described.

Modification 1

Figure 8:
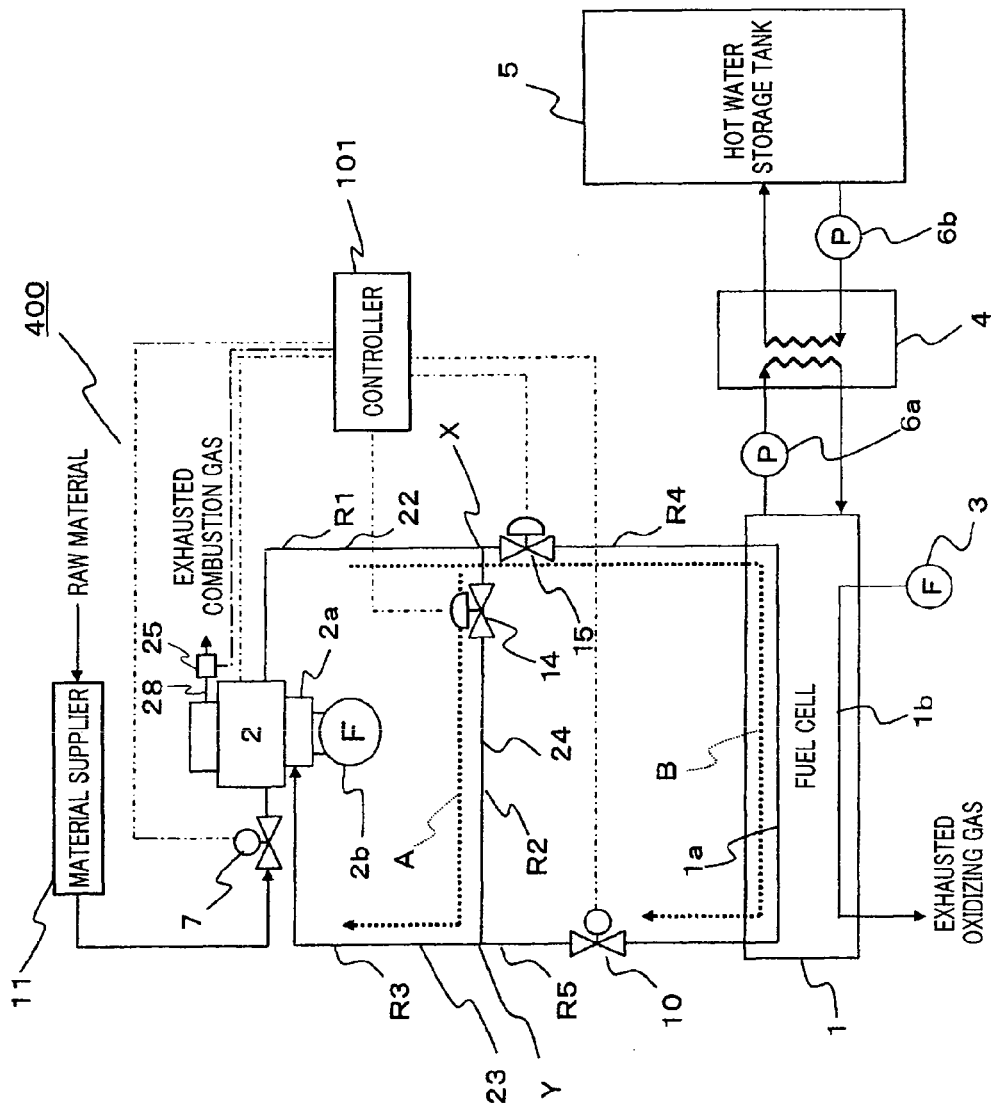
FIG. 8 is a block diagram schematically showing a configuration of a fuel cell system according to modification 1 of Embodiment 4 of the present invention.

FIG. 8 is a block diagram schematically showing a configuration of a fuel cell system according to modification 1 of Embodiment 4 of the present invention.

In the fuel cell system of this Embodiment, if a specified combustion state detector detects that combustion of the combustion burner 2a is not stable (in other words, the air ratio is a value near 1) even though the flow rate control valves 14 and 15 are controlled to have predetermined opening degrees to achieve the desired flow rate ratio, it is desirable to control the opening degree of at least one of the flow rate control valves 14 and 15 based on the value of the combustion state detector. Accordingly, in modification 1, as shown in FIG. 8, as a combustion state detector, a combustible gas detector 28 is attached on an exhausted combustion gas path 28 through which the combustion gas which is exhausted from the combustion burner 2a flows to detect a raw material or carbon monoxide in the exhausted combustion gas, for example. The combustible gas detector 25 is constituted by, for example, combustible gas concentration sensor. The controller 101 feedback-controls the opening degrees of the flow rate control valves 14 and 15 so that the combustible gas concentration in the exhausted combustion gas reaches a predetermined value (combustible gas concentration corresponding to a predetermined combustion state), based on the detection value of the combustible gas detector 25. To be specific, the controller 101 determines that the combustion is unstable because the fuel gas supplied to the fuel cell 2, of the fuel gas output from the fuel gas generator 2, is excess in amount, when the combustible gas concentration in the exhausted combustion gas which is detected by the combustible gas detector 25 is larger than a predetermined threshold, and decreases the opening degree of the flow rate control valve 15 or increases the opening degree of the flow rate control valve 14. This makes it possible to prevent that the air ratio in the combustion in the combustion burner 2a is smaller than 1 and hence stabilize the combustion.

Modification 2

FIG. 9 is a block diagram schematically showing a configuration of a fuel cell system according to modification 2 of Embodiment 4 of the present invention.

In modification 2, as shown in FIG. 9, a voltage detector 26 is provided to detect a voltage value of the fuel cell 1, as a combustion state detector. The fuel cell 1 is provided with a pair of output terminals 27 for outputting generated electricity. An output current controller (not shown) constituted by an inverter or the like is coupled to the pair of output terminals. The voltage detector 26 is coupled between the pair of output terminals. The voltage detector 26 is constituted by, for example, a voltage meter. The controller 101 feedback-controls the opening degrees of the flow rate control valves 14 and 15 so that an increase speed of the voltage which is measured by the voltage detector 26 from when the gas generated by the fuel gas generator 2 starts to be supplied to the fuel cell 1 reaches a predetermined value. To be specific, when the increase speed is larger than a predetermined threshold (increase speed of a voltage corresponding to a predetermined flow rate ratio), the controller 101 determines that the combustion is unstable because the fuel gas supplied to the fuel cell 2, of the fuel gas output from the fuel gas generator 2, is excess in amount, decreases the opening degree of the flow rate control valve 15 or increases the opening degree of the flow rate control valve 14. This makes it possible to prevent that the air ratio in the combustion in the combustion burner 2a is smaller than 1 and hence stabilize the combustion.

As a matter of course, in Embodiments 2 and 3, in modification 1 or 2, the combustible gas detector 25 or the voltage detector 6 may be provided and the controller 101 may control the valve opening degree of the flow divider 12 or the valve opening degree of the mixer 13 to control the flow rate ratio based on the detection output thereof.

As should be appreciated from the above described Embodiments 1 to 4, in accordance with the present invention, since the flow rate of the natural gas supplied to the combustion burner 2a can be suppressed when the natural gas as the replacement gas is combusted in the combustion burner 2a, it is possible to suppress generation of carbon monoxide at the start of the power generation operation. Thus, with a simple configuration, it is possible to effectively suppress exhausting of carbon monoxide at the start of the power generation operation. As a result, it is possible to provide a fuel cell system which is environmentally-friendly.

Whereas in the above Embodiments 1 to 4, the supply amount of the raw material and the supply amount of the fuel gas as a combustion fuel are controlled so that the air ratio in the combustion burner 2a is 1.2 after the fuel gas generator 2 starts to supply the fuel gas to the fuel cell 1, it is possible to suppress generation of carbon monoxide theoretically so long as the air ratio is at least controlled to be 1.0 or larger.

Whereas in Embodiments 1 to 4, a part of the fuel gas path B is used as the fuel gas path A, the fuel gas path A may alternatively be provided separately from the fuel gas path B. That is, the bypass path 24 may be provided to directly connect the fuel gas generator 2 to the combustion burner 2a.

Whereas in the above embodiments 1 to 4, a raw material filling path extending to the fuel cell 1 is formed by the material supplier 11, the fuel gas generator 2 and the fuel gas supply path 22, a raw material gas bypass path may be provided so as to extend from the material supplier 11 to the fuel cell so as to bypass the fuel gas generator 2.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fuel cell system and an operation method of the fuel cell system of the present invention have an advantage that exhausting of carbon monoxide is suppressed at the start of a power generation operation, and is useful as a fuel cell system or the like using a polymer electrolyte fuel cell.

The invention claimed is:

1. A fuel cell system comprising:
    a fuel cell configured to generate electric power using a fuel gas and an oxidizing gas;
    a fuel gas generator configured to generate the fuel gas containing hydrogen from a raw material;
    a fuel gas supply path through which the fuel gas is supplied from the fuel gas generator to the fuel cell;
    a combustor configured to heat the fuel gas generator;
    a combustion fan configured to supply air to the combustor;
    an off-gas path through which the fuel gas which has not been used in power generation is supplied from the fuel cell to the combustor;
    a bypass path connecting the fuel gas supply path to the off-gas path to supply the fuel gas output from the fuel gas generator to the combustor so as to bypass the fuel cell;
    a flow rate controller configured to control a flow rate of the fuel gas which is output from the fuel gas generator and supplied to the fuel cell and a flow rate of the fuel gas which is output from the fuel gas generator and supplied to the bypass path; and
    a controller programmed to perform a flow dividing step for controlling the flow rate controller such that the fuel gas branches to flow to the fuel cell and to the bypass path,
    wherein the fuel cell system is configured to cause the fuel gas to branch so as to flow to the fuel cell and to the bypass path with a flow dividing ratio with which an air ratio in the combustor in the flow dividing step is 1 or larger in a state where an air supply amount of the combustion fan is constant before and after the flow dividing step.

2. The fuel cell system according to claim 1,
    wherein the controller is programmed to stop the flow dividing step and control the flow rate controller such that the fuel gas output from the fuel gas generator is supplied only to the fuel cell, after the raw material filled inside the fuel cell has been purged from the fuel cell, after start of the flow dividing step.

3. The fuel cell system according to claim 2,
    wherein the controller is programmed to stop the flow dividing step and control the flow rate controller such that the fuel gas output from the fuel gas generator is supplied only to the fuel cell after a time required to purge from the fuel cell the raw material filled inside the fuel cell has lapsed, after start of the flow dividing step.

4. The fuel cell system according to claim 2, further comprising:
    a voltage detector configured to detect a voltage of the fuel cell;
    wherein the controller is programmed to stop the flow dividing step and control the flow rate controller such that the fuel gas output from the fuel gas generator is supplied only to the fuel cell when the voltage detected by the voltage detector reaches a predetermined threshold or larger, after start of the flow dividing step.

5. The fuel cell system according to claim 1, wherein the flow rate controller includes:
    a first flow rate controller disposed on a portion of the fuel gas supply path which is located between a branch portion where the fuel gas supply path branches into the bypass path, and the fuel cell; and
    a second flow rate controller disposed on a portion of the off-gas path which is located between a junction portion where the bypass path is joined to the off-gas path, and the fuel cell;
    wherein the first flow rate controller and the second flow rate controller are on-off valves;
    wherein passage resistance of the fuel gas supply path, passage resistance of the off-gas path, passage resistance of the bypass path and passage resistance of the fuel cell are preset to cause the air ratio in the combustor to be 1 or larger in a state where the on-off valves are opened by the controller and the air supply amount of the combustion fan is constant before and after the flow dividing step so that the fuel gas branches to flow to the fuel cell and to the bypass path, when the fuel gas generator starts to supply the fuel gas to the fuel cell.

6. The fuel cell system according to claim 1,
wherein the flow rate controller includes a flow divider disposed at a branch portion where the fuel gas path branches into the bypass path to adjust the flow dividing ratio with which the fuel gas output from the fuel gas generator branches to flow to the fuel cell and to the bypass path;
wherein the controller is programmed to control the flow divider such that the fuel gas branches to flow to the fuel cell and to the bypass path and control the flow divider to adjust the flow dividing ratio so that the air ratio in the combustor is 1 or larger in a state where the air supply amount of the combustion fan is constant before and after the flow dividing step, when the fuel gas generator starts to supply the fuel gas to the fuel cell.

7. The fuel cell system according to claim 1,
wherein the flow rate controller includes a mixer disposed at a junction portion where the bypass path is joined to the off-gas path to adjust a mixing ratio between the fuel gas flowing in the bypass path and an excess fuel gas which has not been used in power generation and flows through the off-gas path; and
wherein the controller is programmed to control the mixer such that the fuel gas branches to flow to the fuel cell and to the bypass path, and control the mixer to adjust the flow dividing ratio so that the air ratio in the combustor is 1 or larger in a state where the air supply amount of the combustion fan is constant before and after the flow dividing step, when the fuel gas generator starts to supply the fuel gas to the fuel cell.

8. The fuel cell system according to claim 1, further comprising:
a material supplier configured to supply the raw material to the fuel gas generator;
wherein the controller is programmed to cause the material supplier to fill the raw material inside the fuel cell during a state where power generation of the fuel cell is stopped; and then to control the flow rate controller to cause the fuel gas to branch.

9. The fuel cell system according to claim 1,
wherein the controller is programmed to perform the flow dividing step when the fuel gas which was supplied from the fuel gas generator only to the bypass path starts to be supplied to the fuel cell filled with the raw material.

10. A method of operating a fuel cell system including:
a fuel cell configured to generate electric power using a fuel gas and an oxidizing gas;
a fuel gas generator configured to generate the fuel gas containing hydrogen from a raw material;
a fuel gas supply path through which the fuel gas is supplied from the fuel gas generator to the fuel cell;
a combustor configured to heat the fuel gas generator;
a combustion fan configured to supply air to the combustor;
an off-gas path through which the fuel gas which has not been used in power generation is supplied from the fuel cell to the combustor; and
a bypass path connecting the fuel gas supply path to the off-gas path to supply the fuel gas output from the fuel gas generator to the combustor so as to bypass the fuel cell;
the method comprising:
a flow dividing step for causing the fuel gas to branch to flow to the fuel cell and to the bypass path, wherein
the fuel gas branches so as to flow to the fuel cell and to the bypass path with a flow dividing ratio with which an air ratio in the combustor in the flow dividing step is 1 or larger in a state where an air supply amount of the combustion fan is constant before and after the flow dividing step.

11. The method according to claim 10, wherein the flow dividing step is performed when the fuel gas which was supplied from the fuel gas generator only to the bypass path starts to be supplied to the fuel cell filled with the raw material.

* * * * *